(12) United States Patent
Mattson, Jr. et al.

(10) Patent No.: US 6,751,814 B2
(45) Date of Patent: Jun. 22, 2004

(54) WHIRLPOOL BATH FILTER AND SUCTION DEVICE

(75) Inventors: Roy W. Mattson, Jr., Longmont, CO (US); Paulette C. Ogden, Longmont, CO (US)

(73) Assignee: Roy Mattson, Longmont, CO (US)

( * ) Notice: Subject to any disclaimer, the term of this patent is extended or adjusted under 35 U.S.C. 154(b) by 0 days.

(21) Appl. No.: 10/005,953

(22) Filed: Nov. 2, 2001

(65) Prior Publication Data

US 2003/0213059 A1 Nov. 20, 2003

(51) Int. Cl.[7] .................................................. E04H 1/12
(52) U.S. Cl. ............................. 4/504; 4/507; 4/541.1; 210/416.2
(58) Field of Search .......................... 4/504, 507, 509, 4/541.1; 210/169, 416.2

(56) References Cited

U.S. PATENT DOCUMENTS

| | | | | |
|---|---|---|---|---|
| 2,329,987 A | | 9/1943 | Goodloe ................. 210/315 |
| 3,263,811 A | * | 8/1966 | Baker et al. ............ 210/169 X |
| 4,233,694 A | | 11/1980 | Janosko et al. ............. 4/509 X |
| 4,340,039 A | | 7/1982 | Hibbard et al. .......... 4/541.4 X |
| 4,349,434 A | | 9/1982 | Jaworski ................. 210/169 X |
| 4,359,790 A | | 11/1982 | Chalberg ..................... 4/541.4 |
| 4,426,286 A | | 1/1984 | Puckett et al. .......... 210/169 X |
| 4,533,476 A | | 8/1985 | Watkins .................... 4/541.1 X |
| 4,552,658 A | | 11/1985 | Adcock et al. ............. 4/541.3 |
| 4,637,873 A | | 1/1987 | DeSousa et al. ............ 4/507 X |
| 4,818,389 A | | 4/1989 | Tobias et al. ................. 4/507 X |
| 4,971,687 A | | 11/1990 | Anderson ................... 210/85 |
| 5,236,581 A | | 8/1993 | Perry ....................... 4/541.1 X |
| 5,277,802 A | | 1/1994 | Goodwin .................... 210/202 |
| 5,328,602 A | | 7/1994 | Brooks ...................... 4/509 X |
| 5,383,239 A | | 1/1995 | Mathis et al. ................. 4/541.1 |
| 5,656,159 A | | 8/1997 | Spencer et al. ............. 210/206 |
| 5,799,339 A | | 9/1998 | Perry et al. ..................... 4/286 |
| 5,810,999 A | | 9/1998 | Bachand et al. ............ 210/206 |
| 5,928,510 A | | 7/1999 | Meredith .................... 210/232 |
| 6,038,712 A | | 3/2000 | Chalberg et al. ............... 4/507 |
| 6,065,161 A | | 5/2000 | Mateina et al. .............. 4/541.6 |
| 6,066,253 A | | 5/2000 | Idland et al. ................... 4/507 |
| 6,170,095 B1 | * | 1/2001 | Zars ............................... 4/507 |
| 6,283,308 B1 | | 9/2001 | Patil et al. ................... 210/484 |
| 6,395,167 B1 | * | 5/2002 | Mattson, Jr. et al. ..... 4/541.3 X |

OTHER PUBLICATIONS

The American Society of Mechanical Engineers, ASME/ANSI A112.19.8M–1987, Reaffirmed 1996, Suction Fittings for Use in Swimming Pools, Wading Pools, Spas, Hot Tubs, and Whirlpool Bathtub Appliances 11 pgs.

The American Society of Mechanical Engineers, ASME A112.19.7M–1995, Whirlpool Bathtub Applicances 14 pgs.

* cited by examiner

Primary Examiner—Robert M. Fetsuga
(74) Attorney, Agent, or Firm—Rick Martin; Patent Law Offices of Rick Martin, P.C.

(57) ABSTRACT

A whirlpool bath has a combination suction fixture and disposable filter. The suction fixture is a plastic semi-cylindrical housing attachable to the tub. A removable faceplate is reinforced and resistant to body and hair entrapment. The disposable filter is fibrous having a porous core, wherein the porous core has a series of holes and/or slots graduating in size from small at the outlet end to large at the remote end. The filter, sloped floor of the housing and drain slots provide for low water retention during shutdown. A safety/sanitation port on the outlet port creates cavitation if the whirlpool bath is operated without the disposable filter. The preferred embodiment removable faceplate is attached to the housing via a magnet and a peripheral ledge providing a pop off design. The preferred embodiment filter also has a pop off design.

12 Claims, 20 Drawing Sheets

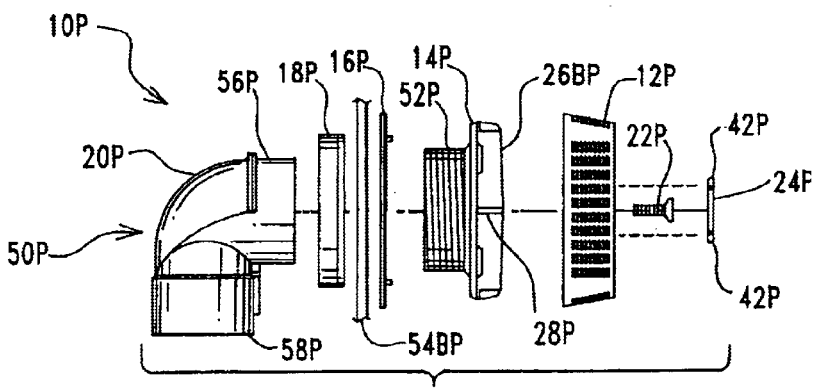
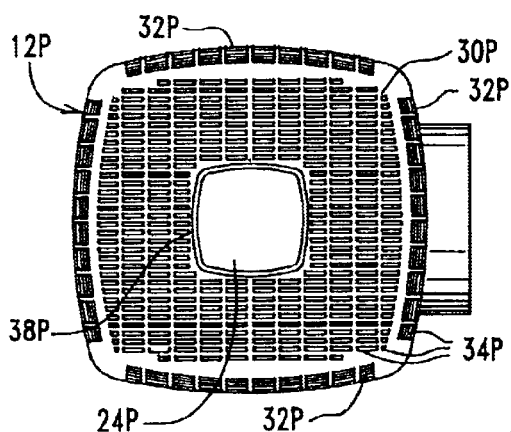
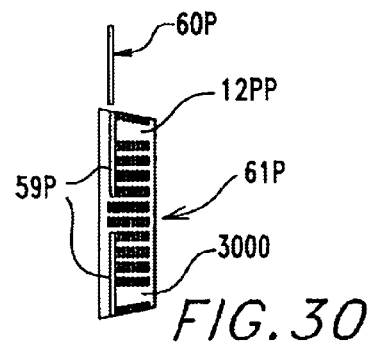
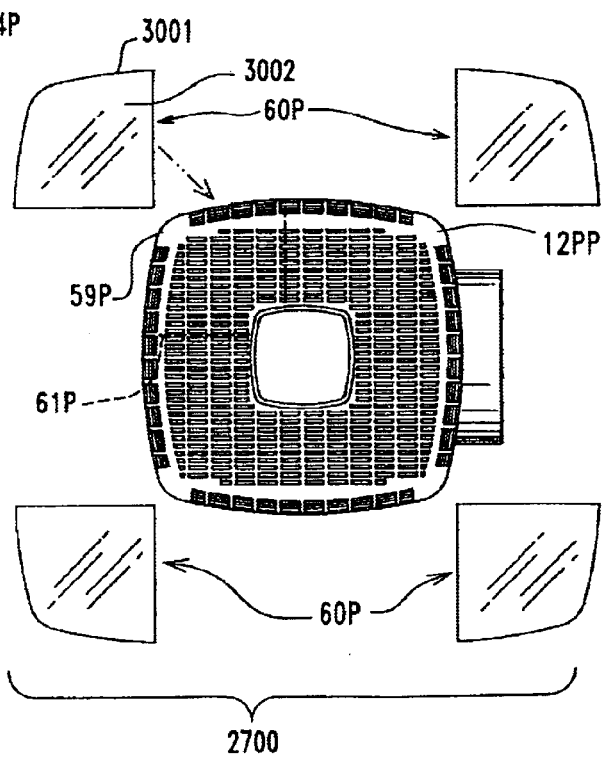
FIG.27 (PRIOR ART)
FIG.28 (PRIOR ART)
FIG.30
FIG.29

WHIRLPOOL BATH FILTER AND SUCTION DEVICE

REFERENCE TO RELATED APPLICATION

U.S. Pat. No. 6,283,308 (2001) to Patil, et al., U.S. Pat. No. 4,340,039 (1982) to Hibbard et al., and U.S. Pat. No. 5,799,339 are incorporated herein by reference.

FIELD OF THE INVENTION

The present invention relates to combining a replaceable filter and a suction device in a closed loop home or hotel whirlpool bath, hydrotherapeutic baths, and other bathing receptacles.

BACKGROUND OF THE INVENTION

Whirlpool-type baths have been employed to treat discomfort resulting from strained muscles, joint ailments and the like. More recently, such baths have been used increasingly as means of relaxing from the daily stresses of modern life. A therapeutic effect is derived from bubbling water and swirling jet streams that create an invigorating sensation to massage the user's body.

To create the desired whirlpool motion and hydro massage effect a motorized water pump draws water in through a suction fitting in a receptacle, such as a bathtub. The user first fills the bathtub. Then the user activates the closed loop whirlpool system. The water travels through a piping system and back out jet fittings. Jet fittings are typically employed to inject water at a high velocity into a bathtub. Usually the jet fittings are adapted to aspirate air so that the water discharged into the receptacle is aerated to achieve the desired bubbling effect. (See for instance, U.S. Pat. No. 4,340,039, incorporated herein by reference).

Whirlpool baths currently do not have a filtration system to filter debris in the water as do indoor and outdoor spas. Whirlpool baths are designed as with a normal bathtub to be drained after each use. However, debris in the form of dead skin, soap, hair and other foreign material circulates throughout the piping and pump system. This debris does not completely drain and over time accumulates in the piping system and may cause a health risk. Also hair may get twisted and entrapped in the whirlpool bath pumps impeller. Whirlpool bath manufactures for some time have been trying to devise a way to incorporate a filtration system on a closed loop whirlpool bath. The major obstacle they face in using a filtration system for a whirlpool bath is in complying with the plumbing codes. There is no filtration system that is specifically designed for a drain down whirlpool bath that allows a whirlpool bath to pass requirements set forth by plumbing codes. Another reason why there are no filtration systems for Whirlpool bathtubs is because Whirlpool baths must meet stringent drain downcode requirements set up by the American Society of Mechanical Engineers (ASME). The code that governs whirlpool baths is entitled "Whirlpool Bath Appliances" (ASME A112.19.7M 1995). Section 5 of this code covers water retention. It states the "whirlpool bath appliances shall be of such design as to prevent retention of water in excess of 44 ml. (1½ fl oz) for each jet and suction filter. The average whirlpool bath has a 6-jet system and has one suction fitting. This system configuration can only retain 10½ ounces of water in the complete whirlpool bath system after draining to meet code. This is for a six jet one suction whirlpool bath. Most quality whirlpool baths retain less than 4 ounces of water in the whirlpool bath system after draining. Therefore, the filter part of the system cannot retain over six and a half ounces of water, because the total water retention would exceed 10½ ounces. These requirements for whirlpool baths fall under the American Society of Mechanical Engineers code entitled "Whirlpool Bathtub Appliances." Currently there are no known filtration systems designed for whirlpool baths. Currently there are no known filtration systems designed for whirlpool baths that retain less than 6½ ounces of water except for the present invention.

Another important consideration in developing a filtration system for whirlpool baths is the ease of replacing the filter. It needs to be designed so the filter can be replaced from inside the bath. This way access panels on the underside of the whirlpool bath to access the filter can be eliminated. The most logical choice for a filter location is in the suction fitting. Placing the filter in the suction fitting presents a whole other range of design concerns. First placing a filter in the suction fitting might cause undue stress on the pump motor. The suction filter must pass the codes set up by ASME for suctions. The code for suctions from ASME is titled Suction Fittings for use in swimming pools, spas, hot tubs, and whirlpool bathtub appliances (ASME/IAMPO reaffirm 1996). There are a variety of load and structural tests the suctions have to pass. The present invention provides a cavity that houses a filter that could be installed to have the filter replaced from the inside of a whirlpool bath. The complete filtration system retains less than 4 ounces of water and as little as 2 ounces of water; so most whirlpool bath companies could use it on their whirlpool bath models and pass the drain down codes for whirlpool baths. The filter had to be made small to meet the drain down requirements. However, since it was small it had to be very efficient. The present invention has a specially designed filter core. The core is engineered with varying spaced and sized holes along the length of the core. This design allows water to be drawn through just about the entire filter. Without this design the filter would only pull water through about 20% of the filter near the outlet.

The present invention also provides a new face plate cover. This cover has to be easily removable. It also has to pass the heavy load, impact and hair entrapment tests set out by ASME/IAMPO. One cover embodiment has a radius and back ribbing on it and a removable insert support to pass the strength tests. The preferred embodiment faceplate is flat with structural fins on its back side, thus eliminating the removable insert. Each cover has just the right amount of sized holes to pass the hair entrapment tests. The result is the fluid suction filter device that is especially made just for whirlpool baths.

U.S. Pat. No. 4,340,039 (1982) to Hibbard et al. discloses a hydromassage apparatus for a whirlpool bath system. It has a closed loop water circulation system, adjustable nozzles and venturi air injector, (incorporated herein by reference).

U.S. Pat. No. 4,637,873 (1987) to DeSousa et al. discloses a front load skimmer type filter for spas and pools. A skimmer housing supports a polyester fabric filter having pleated filter media and a central polyvinyl chloride (PVC) pipe with a porous core, a solidified potting compound for a solid top, and an open bottom. It does not support a series of expanding diameter holes for the porous core as does the present invention, (incorporated by reference). It does not meet draindown requirements of ASME for whirlpool baths as does the present invention. It does not meet the ASME requirements for suction fittings and therefore needs to operate in conjunction with a below the waterline suction.

U.S. Pat. No. 4,349,434 (1982) to Jaworski discloses a filtration system piped in away from a pool, spa, hot tub and the like. A filter cartridge and filter is used.

U.S. Pat. No. 4,359,790 (1982) to Chalberg discloses a three piece whirlpool bath suction outlet assembly.

U.S. Pat. No. 6,283,308 (2001) to Patil et al. discloses a bacteriostatic filter cartridge having elements impregnated with an anti-microbial agent.

U.S. Pat. No. 6,038,712 (2000) to Charlberg et al. discloses a whirlpool bath suction device with a cavitation assembly to cause the pump to lose its prime when hair blocks the faceplate.

U.S. Pat. No. 5,799,339 (1998) to Perry et al. discloses a suction device for a spa or jetted tub with a turbulence reduction design to reduce the possibility of entangling a user's hair in the faceplate.

SUMMARY OF THE INVENTION

The main aspect of the present invention is to provide in a whirlpool bath a suction fixture and replaceable filter combination apparatus.

Another aspect of the present invention is to provide a safety plate for the suction intake which resists hair entrapment.

Another aspect of the present invention is to provide a pop off suction faceplate and a pop out filter core to provide safety features to prevent drowning.

Another aspect of the present invention is to provide a safety/sanitation port to cause cavitation if the filter is absent or improperly inserted.

Another aspect of the present invention is to provide a minimal water retention filter to retain less than 6½ ounces of water after draindown.

Another aspect of the present invention is to provide a housing which is readily retrofitable and/or incorporated into a new whirlpool bath that retains minimal water.

Other aspects of this invention will appear from the following description and appended claims, reference being made to the accompanying drawings forming a part of this specification wherein like reference characters designate corresponding parts in the several views.

The housing of the suction filter is generally rectangular having a length of four inches to two feet. A semi-cylindrical recess extends behind the installation wall of the tub. The recess surrounds a disposable cylindrical fiber filter which has a support tube in its core. The support tube has a plurality of water holes having increasing diameters extending away from the water outlet. These holes provide for a water flow along the entire length of the filter, instead of just making use of the filter at the outlet and of the filter.

The housing has a sloped lower shelf and slots to allow water to drain back into the tub after shutdown. The housing has a sharp radius end opposite the outlet end, thus allowing the housing to be fitted into the side wall of a tub through a standard size opening cut.

The housing mounting flange has nominally 6–10 counter sunk holes for bolting to the tub via standard nuts and bolts. Silicone is used on the back of the housing flange to prevent leaks.

The original faceplate shown in FIG. 4 slides into the housing to provide for filter replacement. The faceplate has a radius shape to prevent a limb from being sucked up against it which could entrap a body part. ASME hair entrapment standards are met using a plurality of slots or holes. Impact and load tests are met.

In the preferred embodiment faceplate shown in FIG. 25 support bars are now built into the faceplate and fit into receiving slots in the housing. This creates a solid part and allows it to pass impact and load tests called out by ASME code. This is the only suction for whirlpool bathtubs that is designed for the structured supports to be removed after the suction is installed and allows a filter to be installed in the suction housing or replaced and still pass these test. All other known suctions have the main structured support as part of the body (housing) and these supports cannot be removed. See U.S. Pat. No. 5,799,339 which represents all other known suctions. FIG. 5 of U.S. Pat. No. 5,799,339 shows a face view of the support. FIG. 3 shows how FIG. 5 screws in permanently into body 20 of FIG. 3. These supports (26b, 28b called a guide) cannot be removed once the suction is installed.

The preferred faceplate is larger than standard faceplates because of the size of the removable filter. The combination of a filter and a suction in a single device is not known in the prior art. The faceplate now has slots to allow a larger volume of water to pass through it. Because of the increased size of the faceplate the slots have to be designed and engineered in a radiating pattern. This is very important for the plastic injected molding process. With the present design over a horizontal (see '339 patent) or vertical design, the pressure of the injected plastic from the injection point of the mold, (usually the injection point of a mold is located in the center of the mold) hits the small end of the slots instead of the wide end of the slots. The shorter end of the slot can withstand a great deal more pressure over time before failure than if the pressure were subjected to the wide side of the slots. This allows for much longer mold life and a more pleasing finished product. The radiating pattern of slots gives a straight-line flow to the outer edge of the faceplate part. U.S. Pat. No. 5,799,339 FIG. 4 shows a standard slot opening arrangement that represents the arrangement of slots used by manufacturers of slotted face faceplates. U.S. Pat. No. 6,038,712 FIG. 2 shows circular hole openings which represents how other faceplates are made. Slots are preferable over circular holes to increase flow.

The preferred embodiment housing eliminates the drain down slots of the original design because water now evacuates through the bottom slots of the faceplate. The filter core ID is preferably 2" to allow for 200 GPM flow. No other manufacturer makes a filter for whirlpool bathtubs or a filter that fits into a housing outlet that has a 2" ID. Without this ID you would not be able to get 200 GPM to run through the filter core allowing a combination filter suction an overall 200 GPM rating and meets ASME entrapment requirements.

The filter core also has two slots cut into the end that fits into the outlet of the housing. The housing has two male ridges. This makes the preferred filter core the only filter core that fits the preferred housing. The core is designed with varying sized holes and slots. The holes furthest from the outlet port are larger than the holes near the outlet port. This allows water to pull through the entire filter.

The male ridges align a gasket to cover a safety/sanitation port. The core when inserted into the outlet port side of the filter covers the safety/sanitation port, a hole opening that has a plastic tube attached. If the filter were removed or if a person tried to operate the unit without the filter core covering this hole, air from the tube would be drawn into the pump and the pump would cavitate (draw more air than water). The whirlpool bathtub would not operate properly, and people would turn it off. The importance to this is no user would run the unit without the filter in place. The feature reduces the chance of drawing contaminates into the whirlpool bath system. Once contaminates such as hair are entrapped in the pumps impeller, the entire whirlpool bath system becomes contaminated until someone opens the whirlpool bath pump (a long and time consuming process usually requiring a professional), frees the entrapped hair and sanitizes the complete system.

Right now by code, every suction faceplate must be engineered so the faceplate cannot be removed without using a tool. See U.S. Pat. No. 6,038,712 FIG. 2 that shows screw hole openings and U.S. Pat. No. 5,799,339 FIG. 3 number 22 that shows the screw. All known suctions on the market use a form of screw or the like to attach the faceplate to the housing. There are some suction manufacturers that have a cavitation device in the faceplate of the suction, see U.S. Pat. No. 6,038,712. If the face of the suction is restricted significantly, the unit cavitates and the suction against the faceplate decreases. These designs are still dangerous. Hair can still become twisted in the faceplate before the unit shuts down. Once the hair is trapped, you need a tool by code to take the faceplate off. In most cases a screwdriver to remove the screw. The entrapped hair traps the head of the user underwater in the tub water. People still can drown with these devices. The reason for this code of needing a tool to remove the faceplate is that if the faceplate of current suctions are removed, body parts or hair could get trapped in the exposed housing support cross members that are an integral part of the suction body (nonremovable). Since the preferred embodiment suction filter will not operate without the filter in place, there is no need for the screw. If the filter were in place and someone did get their hair caught in the preferred faceplate, the faceplate is held in place by magnets; and the whole faceplate pops off easily. If hair got caught in the exposed filter if the unit were run without the faceplate cover, the filter also pops out easily. There is no chance of getting entrapped if the filter is removed, because the unit cavitates and ceases the suction action and trigger no obstructions in the outlet for anything to become entrapped The filter core has a gasket that slides over the safety/ sanitation port which is a cavitation hole. Without this gasket, the replaceable plastic filter core would rub against the plastic housing outlet and could cause wear over the years to the housing outlet.

The faceplate now preferably attaches to the housing with magnets.

The screw hole openings of the housing are recessed for flush mounting. They also are flat recessed.

The filter media is preferably made out of polypropylene. Others in the spa industry use polyester media No one has an approved filtration system for whirlpool baths, so filters are not used on whirlpool baths. Polypropylene media can be treated in the manufacturing process with antibacterial agents, whereas polyester media cannot be treated effectively with antibacterial agents.

The preferred filter is designed to retain less than 3 ounces of water.

The suction filter housing is installed by using screws to attach it to the whirlpool bathtub. No other suction currently uses screws for installation. All other suctions currently place the housing behind the hole-opening cut into the sidewall of the whirlpool bathtub, and a separate threaded base '339 number 14 is screwed into the housing forming the installation. By using screws the present invention eliminates this extra plastic injected part.

The preferred housing is the only known housing that has sloped sides of the inner wall to allow water to drain back into the whirlpool bathtub when the whirlpool bathtub system is deactivated whether the unit is installed facing left or right.

The present suction filter device could be designed in other configurations than its current rectangular form. The unit could also be designed in a round form or any other shape or size. The filter and filter core could also be made shorter, longer, larger or smaller. The filter could be made smaller for less money to be disposable after each whirlpool bath use. The filter could even be designed in such a way to be incorporated into existing suctions with modification of those suctions. The filter media that filters the water could be pleated or wrapped without pleating around a filter core.

The housing could be designed to incorporate multiple filters. The ridges and slots at the end of the filter core could be made in a variety of shapes or locations to ensure the use of only one filter.

The main body housing could be vacuum formed and become an integral part of the whirlpool bathtub.

The magnets holding the faceplate to the housing could be larger or smaller and arranged in various other locations on each part. The amount of magnets used could be increased or decreased. The faceplate could also be attached using various snap-on configurations. An installation-sealing gasket could be used. The slope in the sidewalls of the housing could be increased or decreased. The overall size of the suction filter could be increased or decreased.

The housing body, faceplate or filter core could be made from other material than injected plastic; it could be stamped or machined out of metal or other material.

The radiating slotted design of the faceplate could have a radiating round hole design.

The safety cavitation hole could be placed anywhere rearward on the outlet of the housing and be various sizes or have multiple openings.

The filter could have various sanitizing materials in its core such as slow dissolving chlorine tablets or other sanitizing material incorporated into the filter core.

The screw and nuts that attach the housing to the sidewall of the whirlpool bathtub could have a washer or use locking nuts or clips and have varying sizes and be made out of a variety of materials, including plastic and nylon or some space age material.

The faceplate back support ribbing is designed in an X pattern, which offers outstanding structural integrity. The circular ribbing adds tremendous strength to the center impact point of the faceplate.

The faceplate is designed to protrude less than ½" into the tub when attached to the housing. This streamline design protrudes much less than most current suctions adding more room to the bathing area of the whirlpool bathtub.

The slotted holes on the top, sides and bottom of the faceplate extend out keeping in line with the radiating design pattern on the face of the faceplate. This makes it an easier part to inject with plastic.

The housing has a flange that provides a resting area for the peripheral ledge of the faceplate when the faceplate is attached to the housing. This resting area allows for weaker magnets to be used to keep the faceplate attached to the housing.

When a conventional suction fitting is operated under a high flow rate, the water flow inside of the fitting can become turbulent or can vortex like a tornado. When the water flow through such a fitting becomes turbulent or vortexes, hair extending through the faceplate of the fitting can become entangled within the fitting, thereby rendering the hair difficult to remove from the fitting. Accordingly, the conventional fitting cannot pass the five-pound pull test at high flow rates.

The present invention filter inside the housing disrupts this vortex. Tests have proved that the GPM actually increase with the filter installed by eliminating these vortexes than running the same test with the filter removed. Less vortex results in less of a chance someone could get his or her hair twisted in the faceplate and entrapped. Therefore, another feature of the present invention is to help provide a laminar flow through the suction/filter.

BRIEF DESCRIPTION OF THE DRAWINGS

FIG. 27 (prior art) is an exploded view of a suction device 10P.

FIG. 28 (prior art) is a front plan view of the cover 12P of the suction device 10P.

FIG. 29 is an exploded view of a suction/filter 2700, an alternate embodiment.

FIG. 30 is a side plan view of the cover 12PP of the suction filter 2700.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF DRAWINGS

Figure 1:
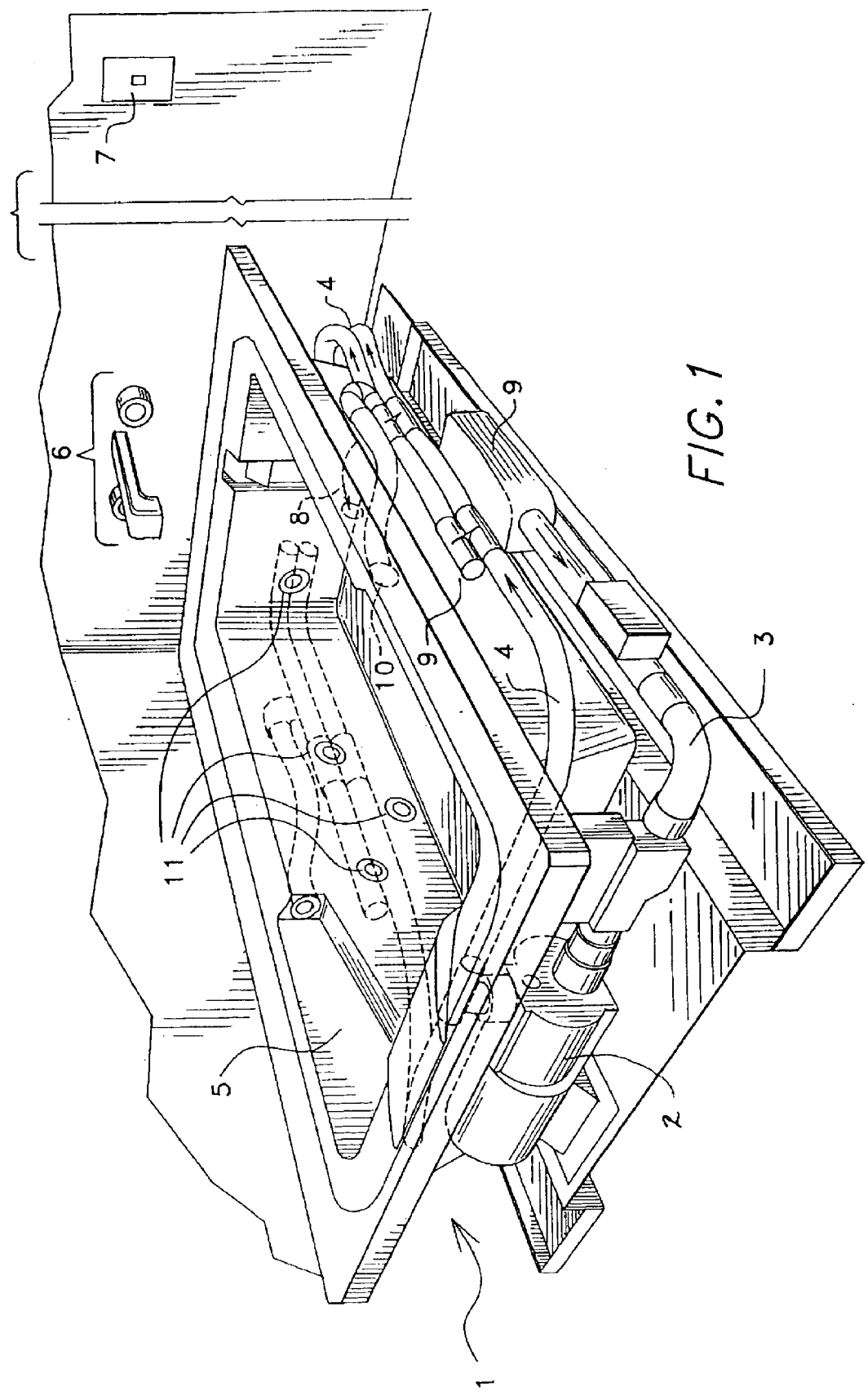
FIG. 1 is a top perspective view of a whirlpool bath having an alternate embodiment of the suction filter installed therein.

Referring first to FIG. 1 a whirlpool bath 1 has a tub 5 with a standard faucet and spicket assembly 6 and a standard tub drain 8. During whirlpool use the no two called out pump 2 circulates water via output pipe 4, air mixing pipe 10 and jets 11. Water is drawn from the filled tub via pump inlet pipe 3 which is connected to the suction filter 9, an alternate embodiment. A switch 7 activates the pump 2.

Figure 2:
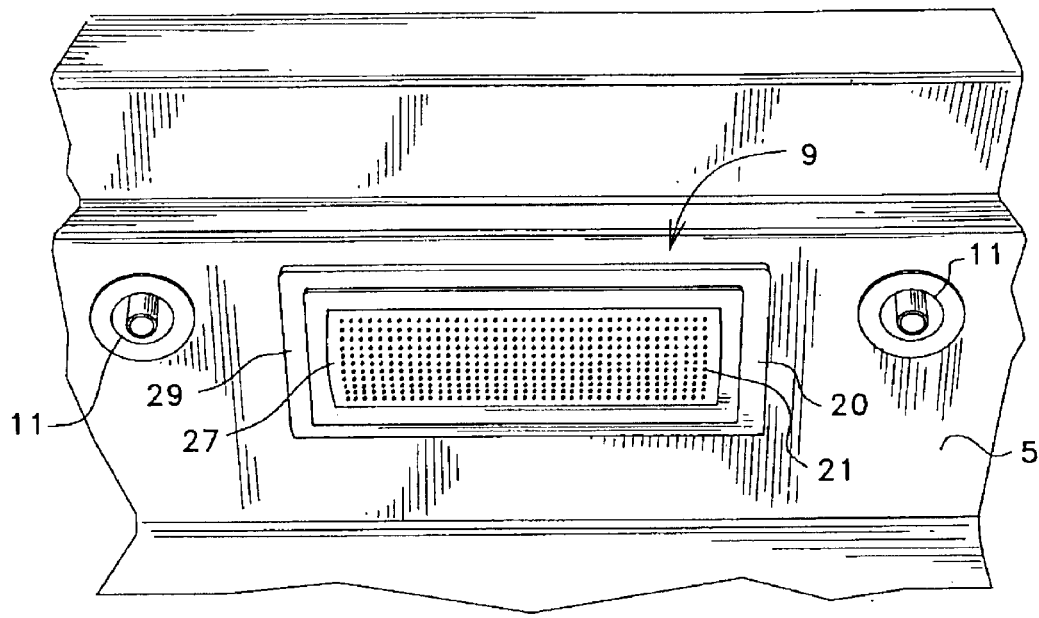
FIG. 2 is a top perspective view of the original faceplate of the suction filter as viewed from the inside of the whirlpool bath shown in FIG. 1.
Figure 4:
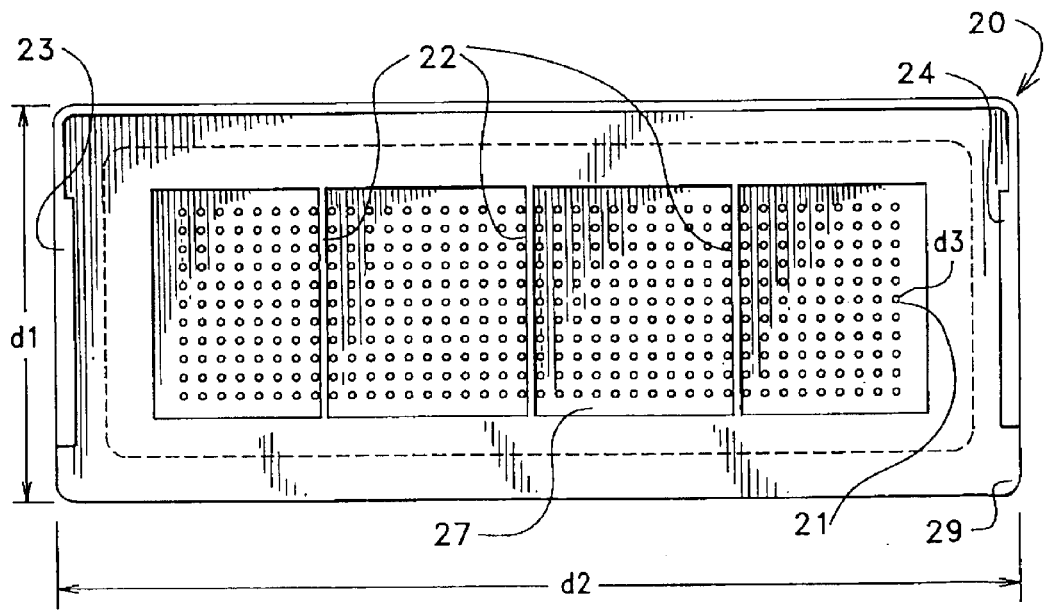
FIG. 4 is a back plan view of the faceplate shown in FIG. 2.
Figure 3:
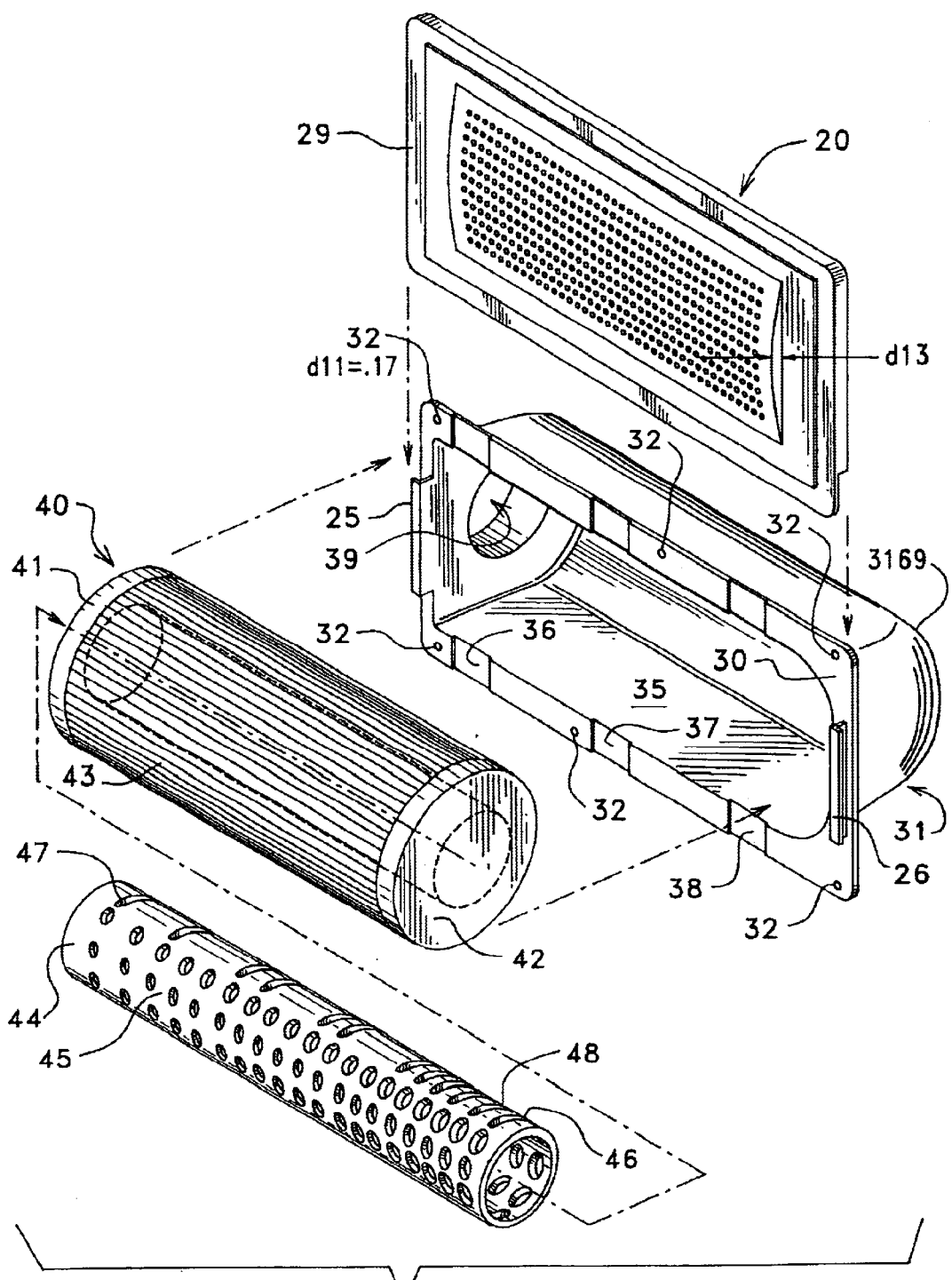
FIG. 3 is an exploded view of the suction filter shown in FIG. 2.

Referring next to FIGS. 2,3,4 the suction filter 9 is shown as seen by a bather in the tub in FIG. 2. The jets 11 are prior art. The only visible portion of the suction filter 9 is a the faceplate 20. The faceplate 20 is preferably rectangular but could have any shape. The faceplate 20 has a peripheral mounting flange rim 29 which has receiving grooves 23,24 to slidingly engage L shaped brackets 25,26. The brackets 25,26 are molded into the mounting flange 30 of the filter housing 31.

The faceplate 20 has a raised convex center 27 which is perforated with a plurality of inlet holes 21 to allow the recirculating water to enter the filter housing 31. The rear of the faceplate 20 has support ribs 22 to strengthen the center 27 to prevent crushing. Hair entrapment is prevented typically in a 1-1½ inch piping system flowing at about 50 gallons per minute with a hole pattern of about 25 holes per square inch at about 0.25 inches O.D.

The filter housing 31 has mounting holes 32 on its mounting flange 30 for attachment to the inner wall of the tub 5 via bolts (not shown), wherein silicone is used behind the mounting flange 30.

The floor 35 of the filter housing 31 slopes downward into the drain slots 36,37,38.

The replaceable filter 40 has a standard fibrous, folding membrane 43 supported at its outlet end by an outlet cap 41 and at its closed end by an end cap 42. The porous core 44 is preferably an ABS pipe mountable in filter housing outlet 39. The holes range from small 45 at the outlet end to large 46 at the closed end adjacent the end cap 42. The slots also range from small 47 to large 48 in a similar fashion, wherein the increasing hole and slot sizes from the outlet end distribute the water flow across the entire length of the membrane 43. Without the hole and slot enlarging feature, the water would only be filtered by a small portion of the membrane near the outlet 39.

Figure 5:
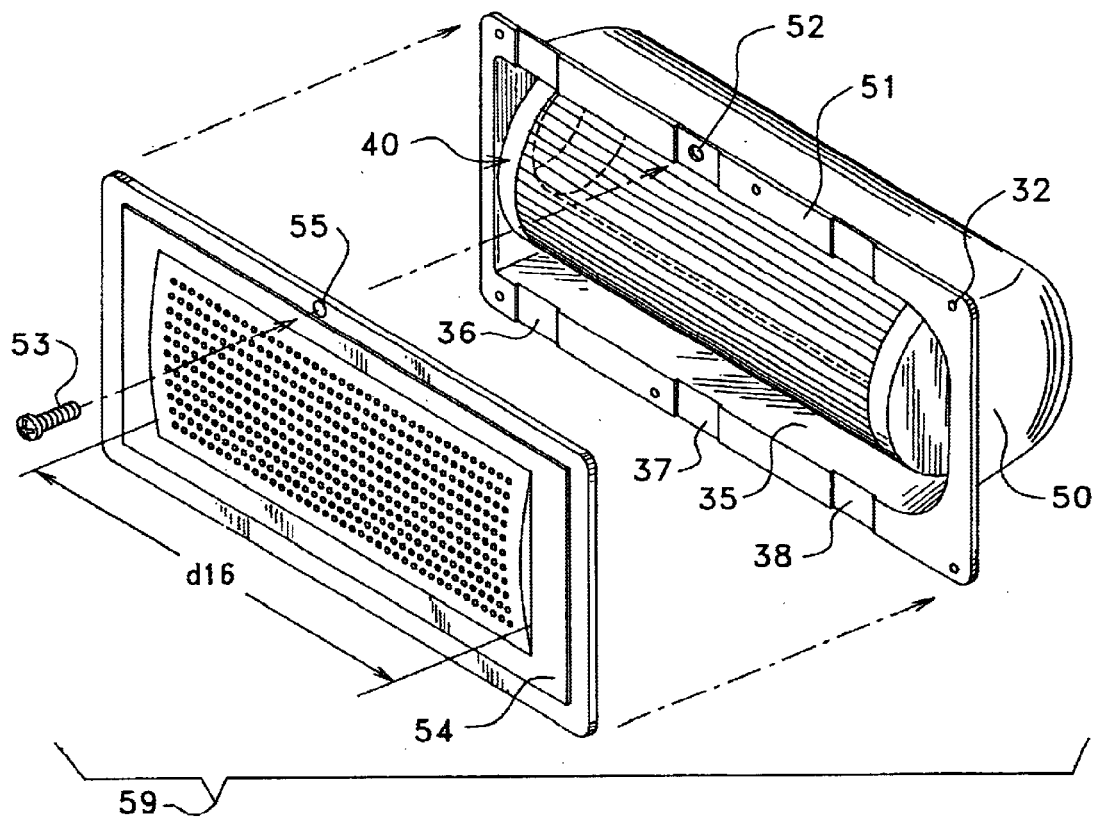
FIG. 5 is a top perspective view of another alternate embodiment faceplate.

Referring next to FIG. 5 an alternate embodiment filter housing 50 has a flange 51 with receiving holes 52 for bolts 53 which mount a faceplate 54 to the flange 51. Multiple holes 55,52 may be used. All other features of the assembly 59 are the same as the FIG. 4 embodiment.

Figure 6:
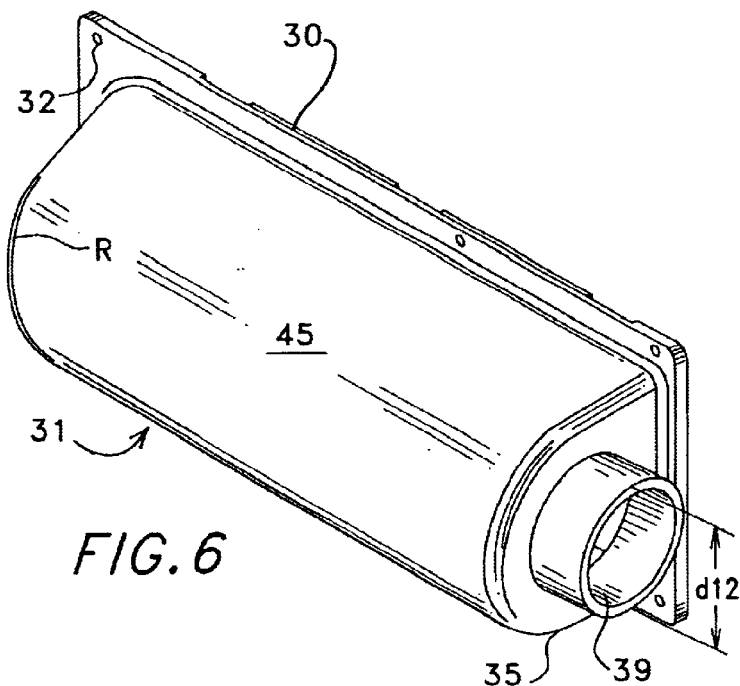
FIG. 6 is a back perspective view of the housing of the suction filter shown in FIG. 2.

Referring next to FIG. 6 the filter housing 31 is seen to have an arcuate top rear and rear wall 169 generally shaped like a semi-cylinder when integrated with the floor 35 (also called a trapepize shape). The relatively sharp radius R allows the housing 31 to be readily installed into a standard size opening cut or formed into the sidewall of the tub, by tilting the housing sideways to allow the outlet 39 to fit.

Figure 7:
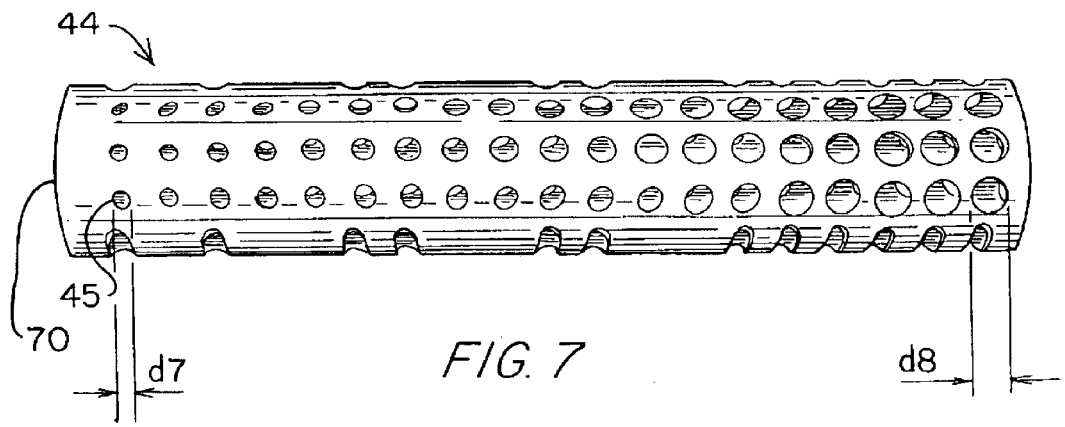
FIG. 7 is a plan view of the original porous core of the filter.
Figure 8:
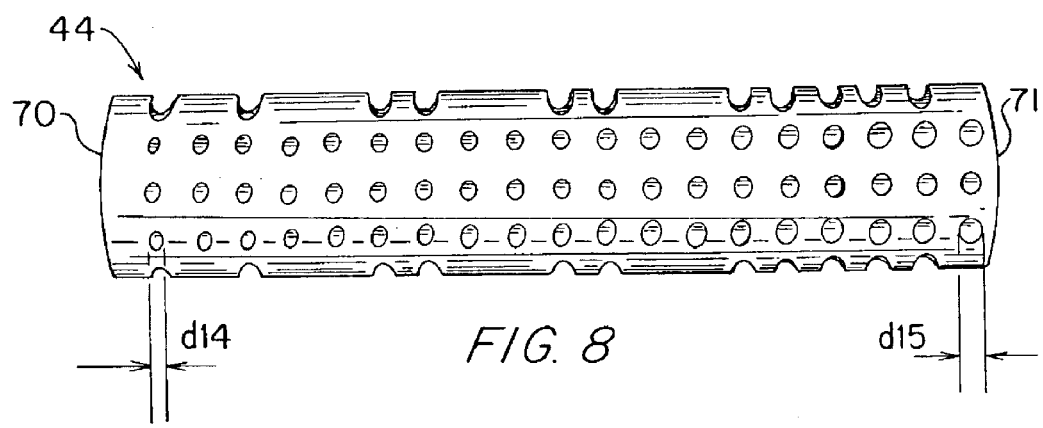
FIG. 8 is the same view as FIG. 7 with the original porous core rotated 90° clockwise.
Figure 9:
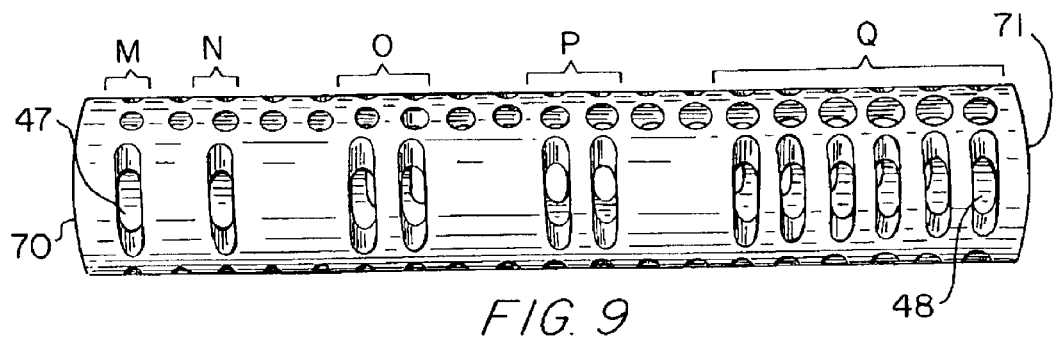
FIG. 9 is the same view as FIG. 8 with the porous core rotated another 90° clockwise.

Referring next to FIGS. 7,8,9 the porous core 44 has an outlet end 70 and a remote end 71. The holes and/or slots at the remote end 71 are larger than the holes and/or slots at the outlet end 70. Also slot groups M,N,O,P,Q have ascending values of slot numbers as they approach the remote end.

Figure 10:
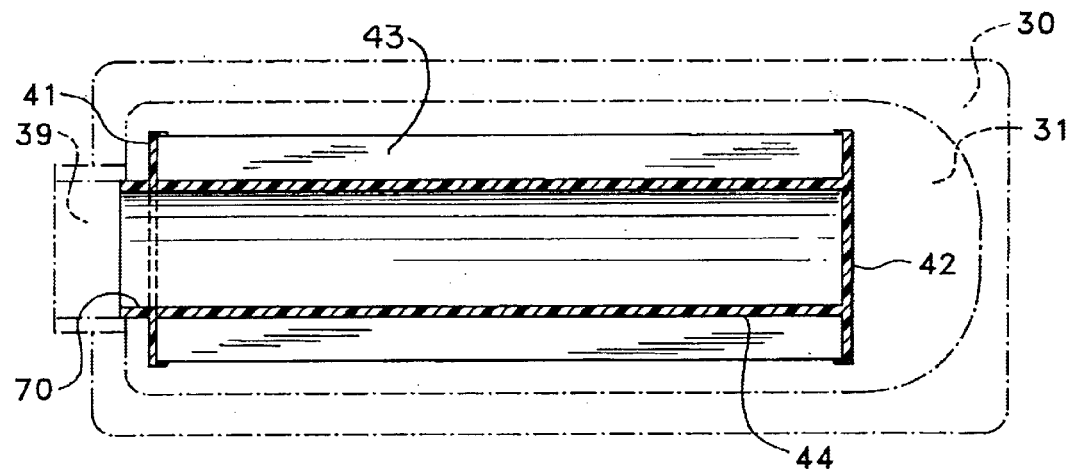
FIG. 10 is a longitudinal sectional view of the housing and filter of FIG. 2.

FIG. 10 shows how the outlet end 70 of the porous core 44 fits into the outlet 39 of the filter housing 31.

Figure 11:
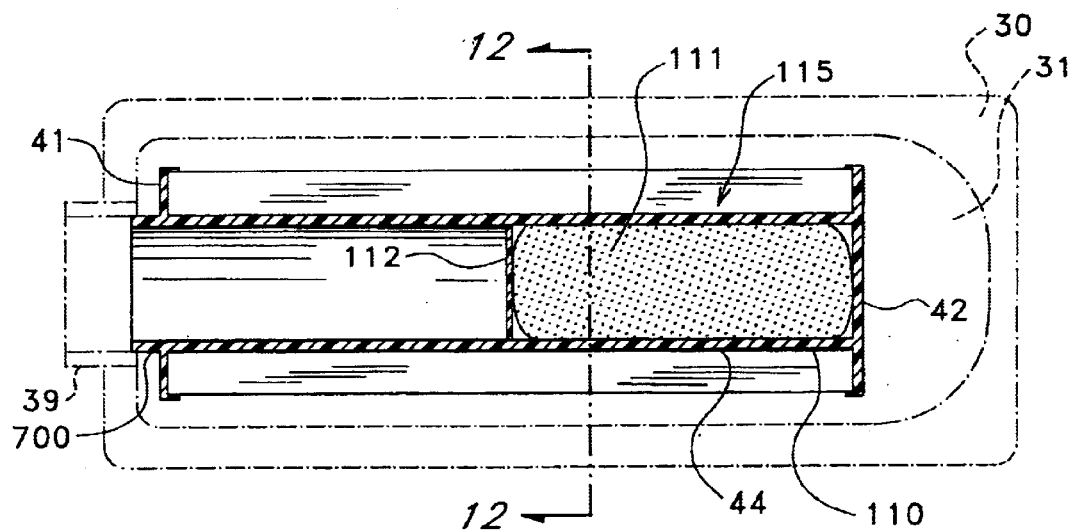
FIG. 11 is a longitudinal sectional view of an alternate embodiment filter having a charcoal bag in the porous core.
Figure 12:
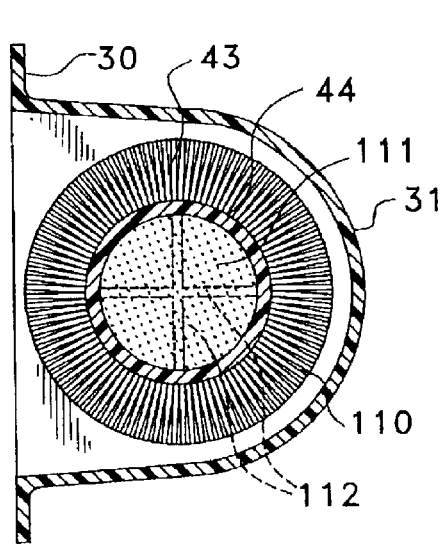
FIG. 12 is a cross sectional view taken along line 12-12 of FIG. 11.

FIGS. 11,12 show an alternate embodiment filter assembly 115 having a charcoal bag filter and/or a chlorine time release pellet, and/or a bromine time release pellet and/or any chosen anti-microbial agent 111 in the center of the porous core 110 and remote from the outlet end. The crosshairs 112 of the core 110 prevent the bag from entering the outlet 39, wherein the outlet end 700 fits into the outlet 39 the same as the preferred embodiment.

Figure 13:
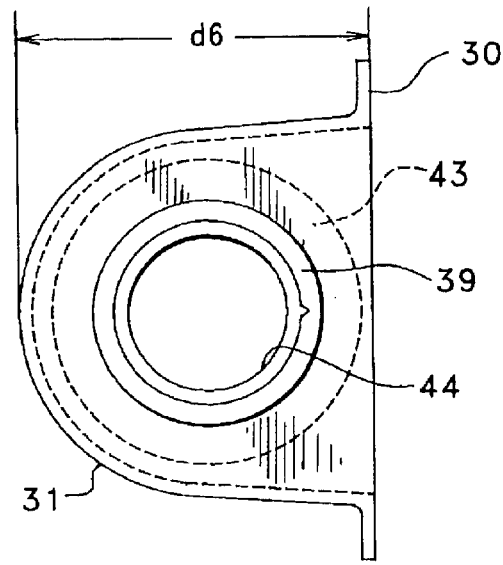
FIG. 13 is a plan view of the outlet end of the original housing.

FIG. 13 shows an outlet end plan view of the preferred embodiment.

Figure 14:
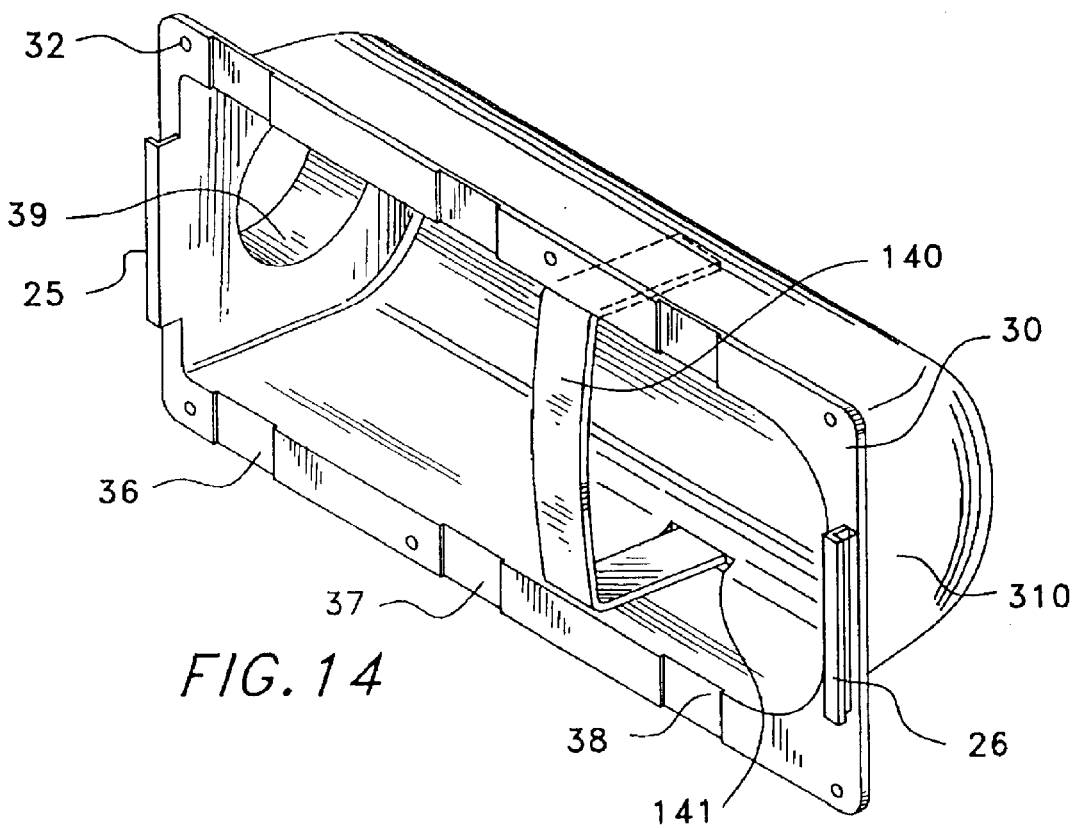
FIG. 14 is a top perspective view of the original housing with an optional mounting bracket for the filter.

Referring next to FIG. 14 an alternate embodiment housing 310 has inside notches 141 to receive a U shaped brace 140.

Figure 15:
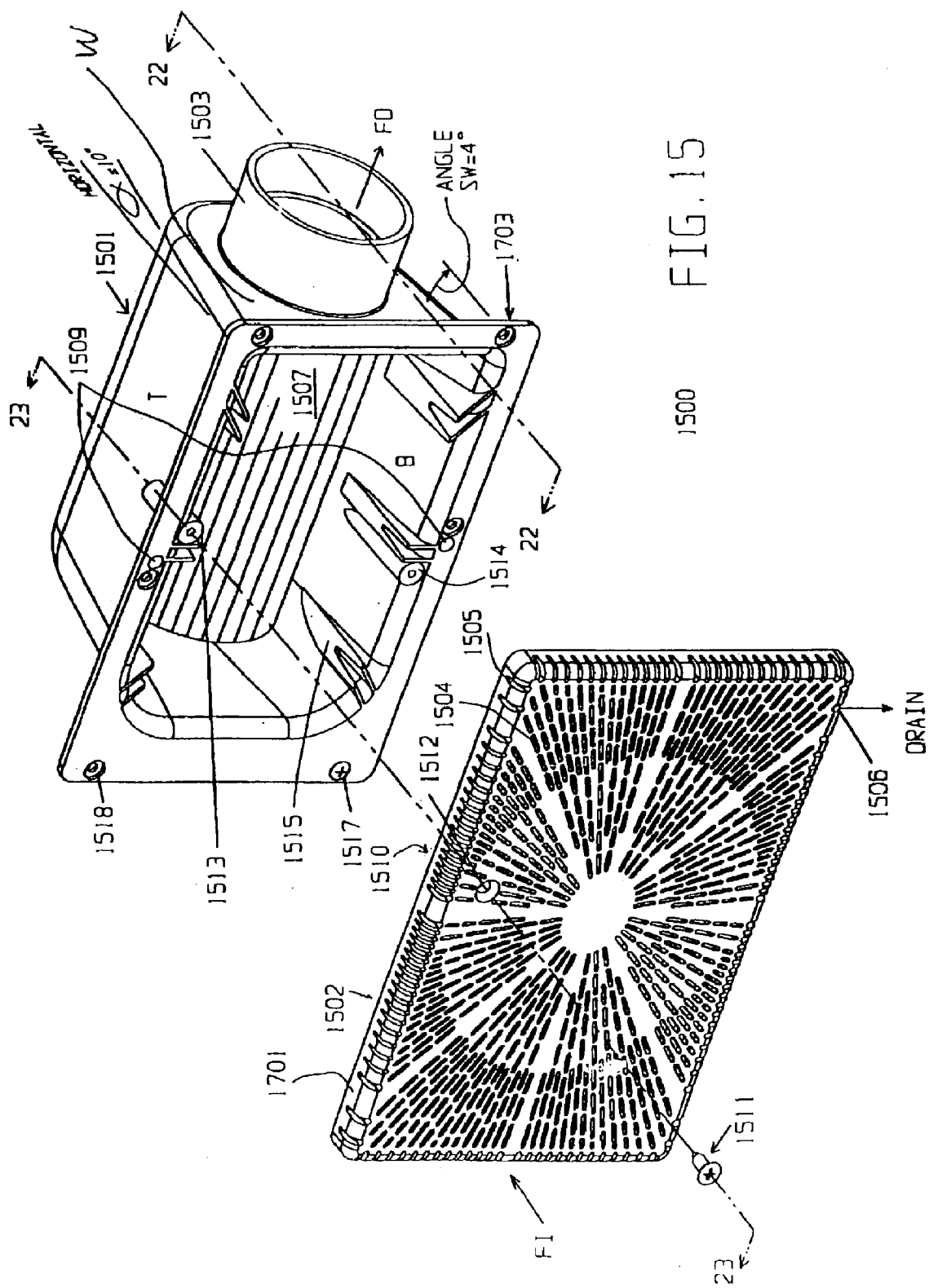
FIG. 15 is an exploded view of another alternate embodiment housing and faceplate design for a suction filter apparatus.
Figure 16:
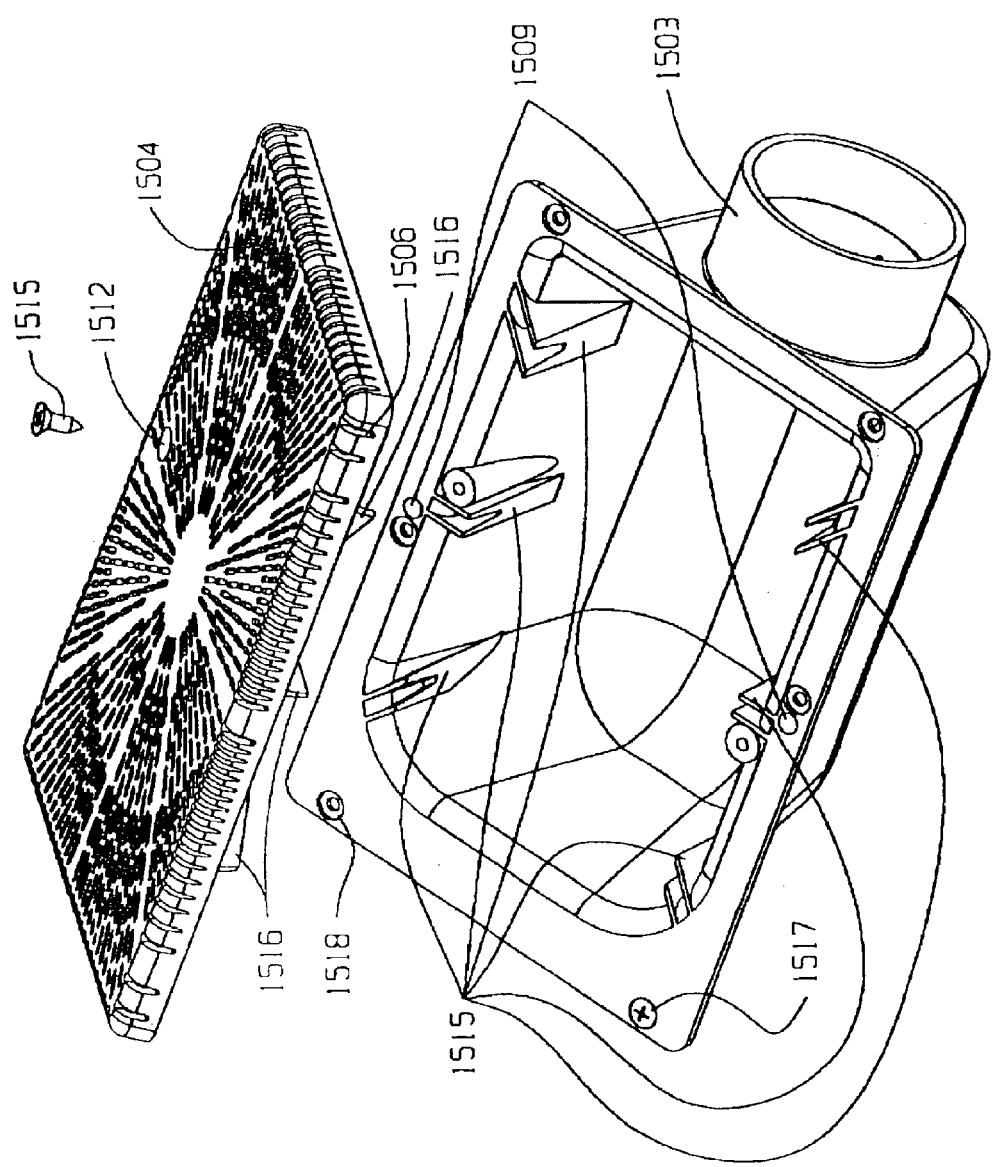
FIG. 16 is a perspective exploded view of the FIG. 15 embodiment.

Referring next to FIGS. 15,16 a suction/filter 1500 consists of a housing 1501 and a faceplate 1502. The housing 1501 is designed to mount flush with a whirlpool bathtub sidewall adjacent the bottom of the bathtub. Water flows into the suction/filter 1500 in direction FI and out the outlet port 1503 in direction FO. The radiating slot pattern 1504 provides for a high flow rate as well as facilitating an injection molding process that allows the molten plastic to migrate radially from a central injection point. The slots extend into the peripheral edge 1701 of the faceplate 1502 as shown by number 1505. The slots 1506 along the bottom edge of the faceplate allow the water to drain out of the housing 1501 in direction DRAIN. This drain function occurs when the whirlpool system is shut off. Proper draining is a key element for water return control as called out by ASME code. Both the top and the bottom of the housing 1501 are sloped as indicated by angle $\alpha$, which may be about 10°, thereby facilitating draining. The housing 1501 can be installed with the outlet port pointing left or right, so the top T and the bottom B are symmetrical to provide proper draining in either orientation.

Figure 22:
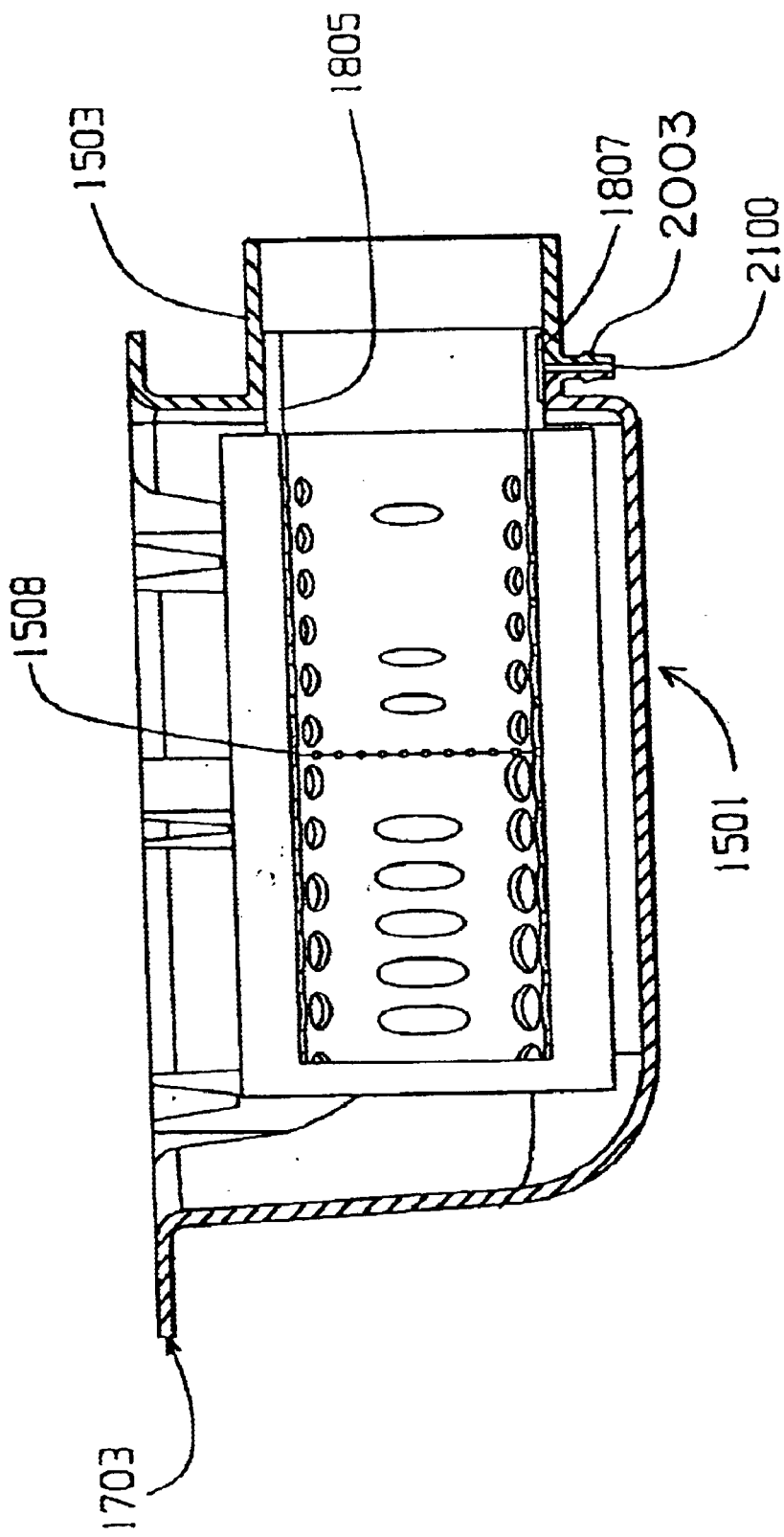
FIG. 22 is a longitudinal sectional view taken along line 22-22 of FIG. 15.

A disposable filter 1507 is supported by a filter core 1508 shown in FIG. 22. To change the disposable filter faceplate 1502 must be removed. This FIG. 15 embodiment secures the faceplate 1502 to the housing 1501 with magnets 1509 and 1510 (see FIG. 17). A screw 1511 is also used to fit through hole 1512 and lock into either screw boss 1513 or 1514, depending on the orientation of the housing 1501.

The suction/filter 1500 must pass an ASME heavy load and impact test to prevent a user from breaking the faceplate 1501 which could cause body entrapment. The housing has a plurality of grooved retainers 1515 which receive the structural fins 1516 which are best seen in FIG. 17.

For attachment to the bathtub wall bolts 1517 are provided which fit into recessed holes 1518.

Figure 17:
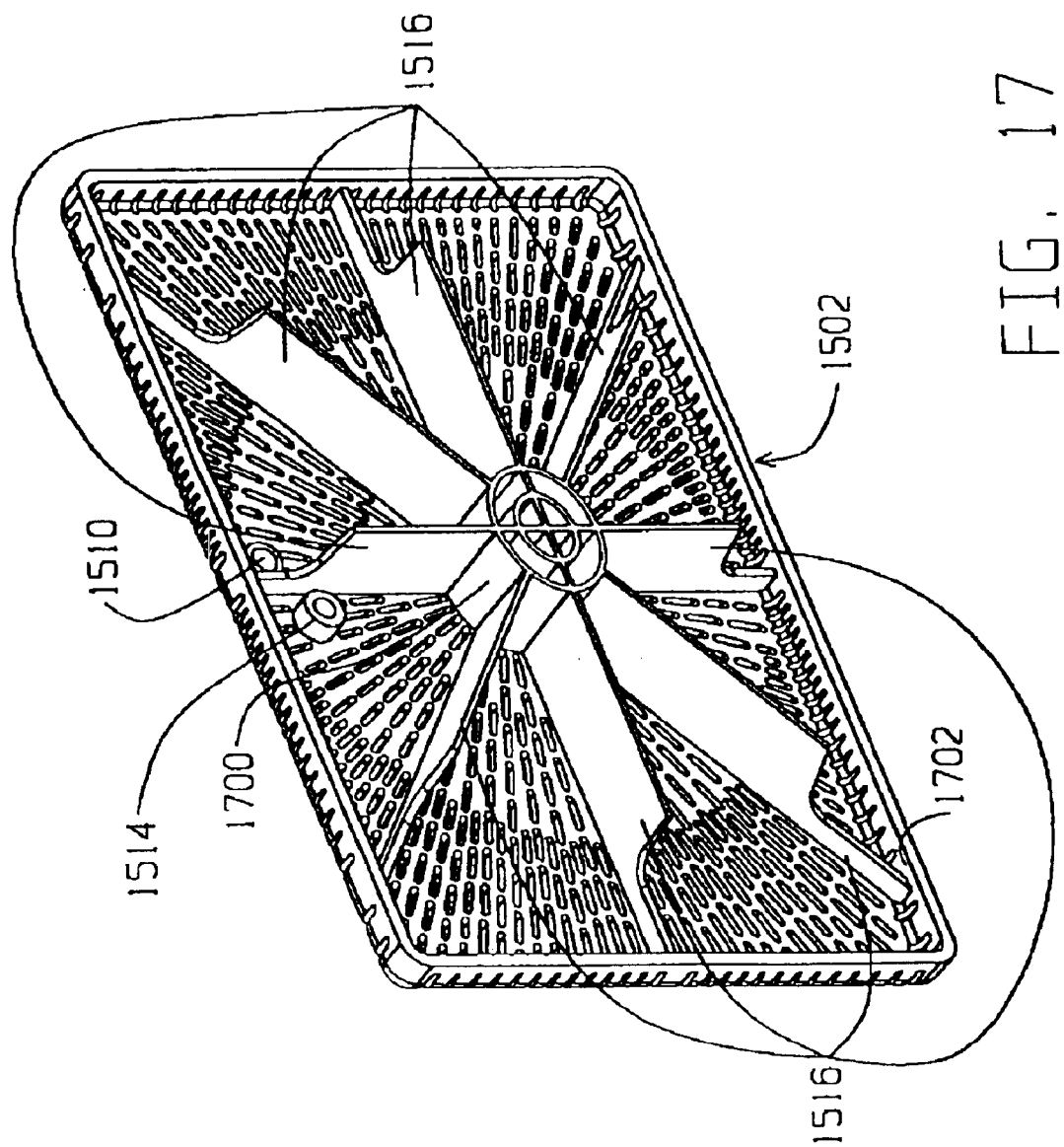
FIG. 17 is a rear perspective view of the FIG. 15 faceplate.

Referring next to FIG. 17 the back of the faceplate 1502 is shown. A central hub 1700 offers structural support for the radiating structural fins 1516. The lengths of each structural fin 1516 may differ as may quantity. The peripheral edge 1701 of the faceplate 1502 forms a support ledge 1702 around the peripheral edge 1703 of the housing 1501.

Figure 18:
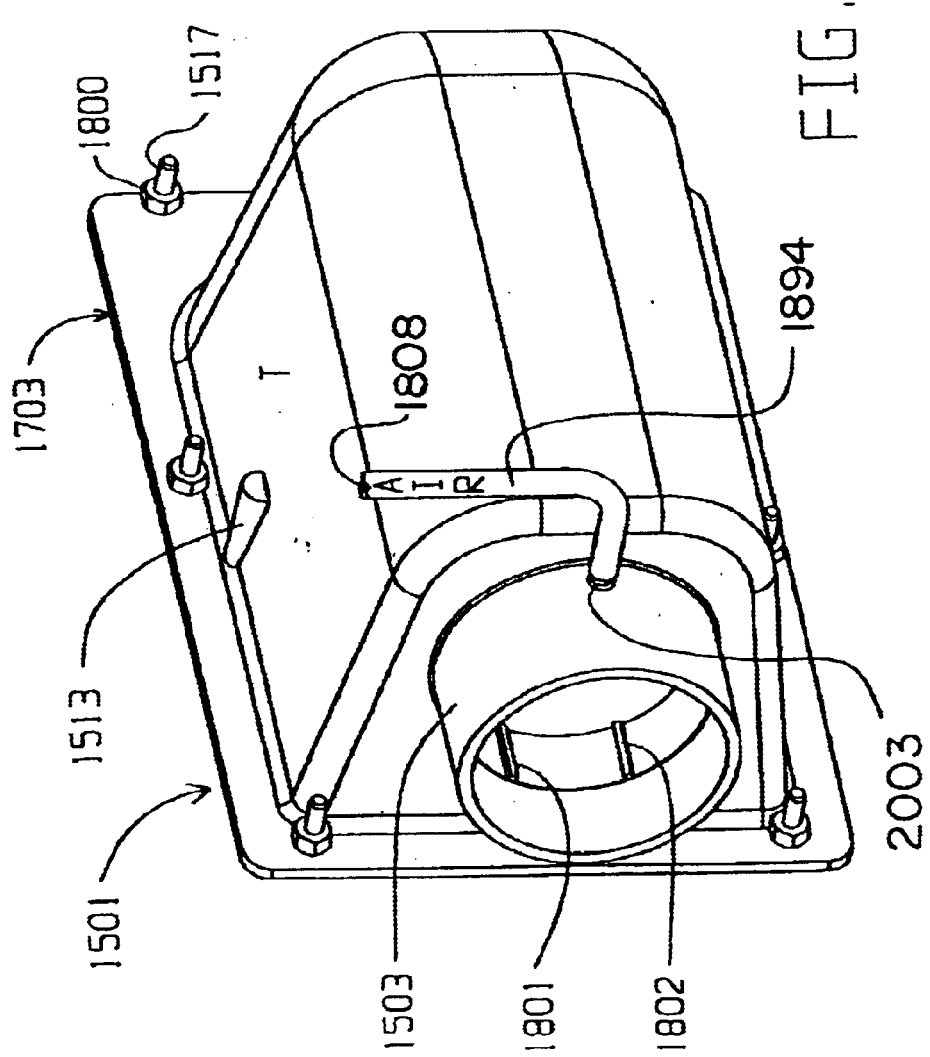
FIG. 18 is a rear perspective view of the FIG. 15 housing.
Figure 20:
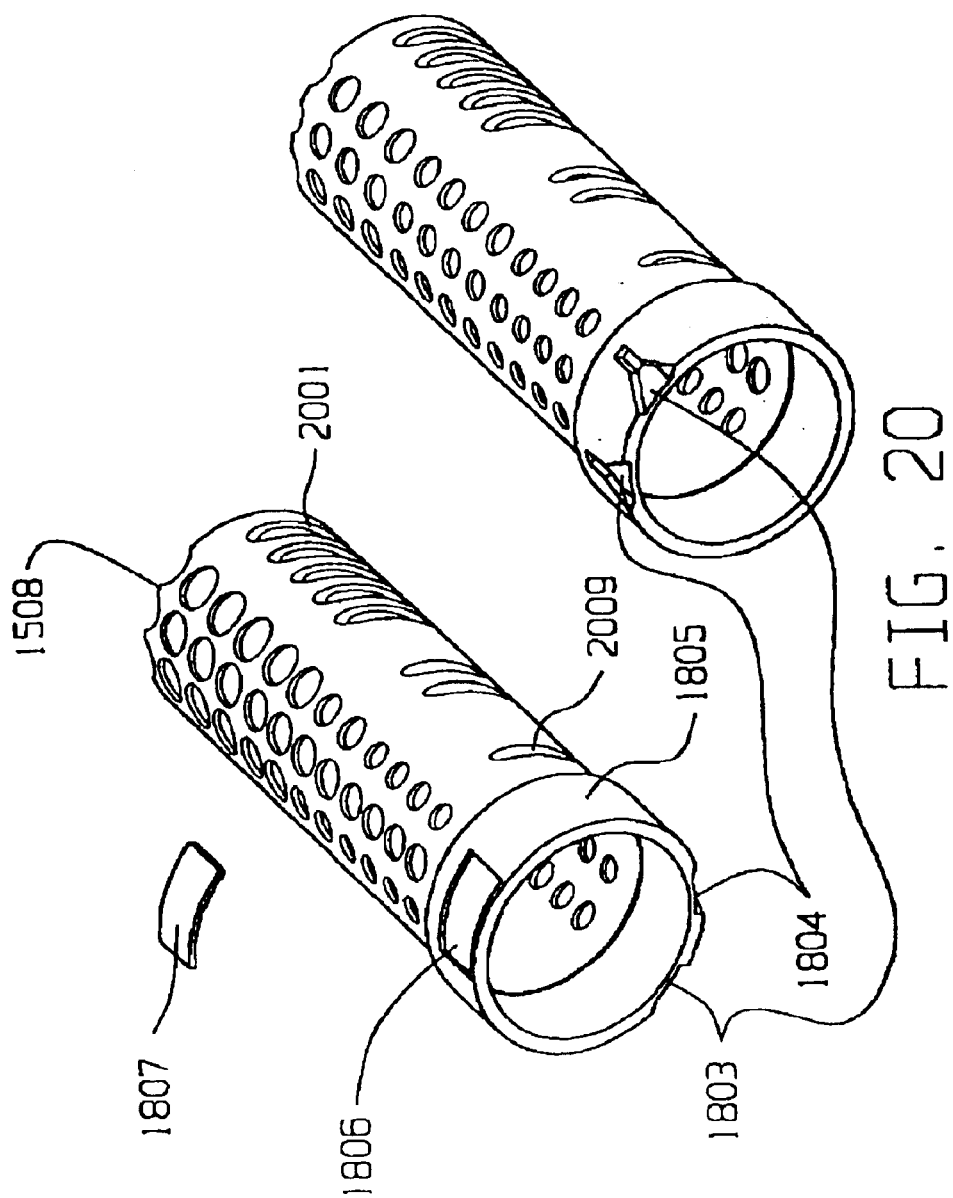
FIG. 20 is a top perspective view of the preferred embodiment filter core.

Referring next to FIG. 18 the back of the housing 1501 is shown. The mounting bolts 1517 have nuts 1800. The outlet port 1503 has two alignment ridges 1801, 1802 which function to align the receiving grooves 1803, 1804 as shown in FIG. 20. A safety/sanitation port 2003 is connected to a tube 1894 which has an open end 1808 that is located at a height h which is above the waterline of the whirlpool bath. If the filter core 1508 is either missing from or improperly seated in the outlet port 1503, then the pump's action pulls AIR down the tube 1894, thereby causing cavitation. This cavitation stops the whirlpool action of the system by inhibiting water suction. The safety/sanitation port 2003 forces the user to always operate the whirlpool with a proper filter properly installed.

Figure 19:
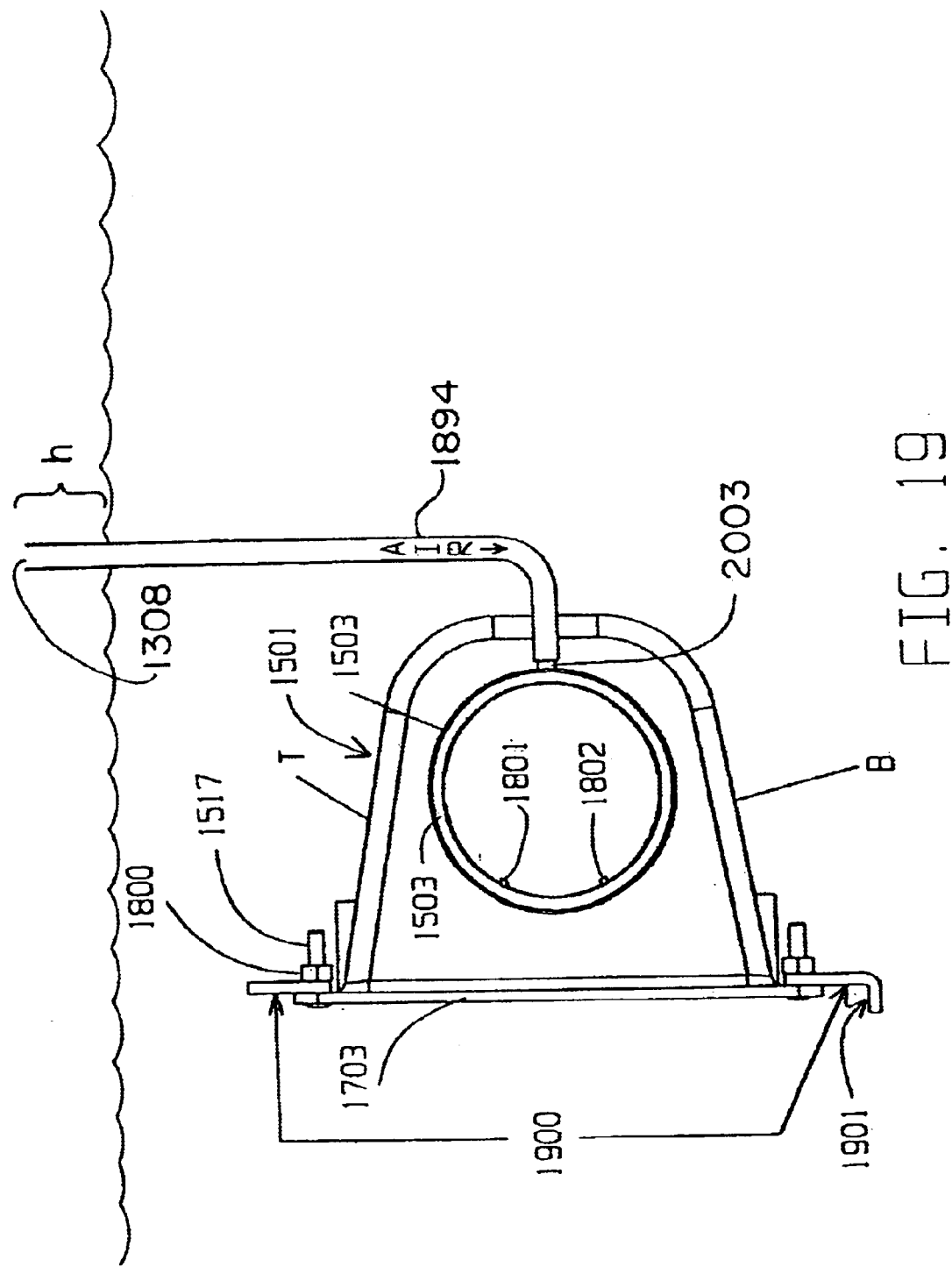
FIG. 19 is a right side plan view of an installed FIG. 15 embodiment.

Referring next to FIG. 19 the housing 1501 is shown bolted to the sidewall 1900 of a whirlpool bath. The placement is close to the bottom 1901 of the whirlpool bath.

Referring next to FIG. 20 a filter core 1508 has the same hole pattern as the embodiment shown in FIGS. 7,8,9. The holes 2009 proximal to the outlet port 1503 are smaller than the holes 2001 distal to the outlet port to force the water through the entire length of filter 1507. The filter core 1508 has a mounting collar 1805. The mounting collar 1805 has a recess 1806 which holds a gasket 1807 in contact with the safety/sanitation port 2003 to seal the safety/sanitation port 2003 during use. The gasket 1807 may be welded and/or glued into the recess 1806. The receiving slots 1803, 1804 align the collar 1805 with alignment ridges 1801, 1802.

Figure 21:
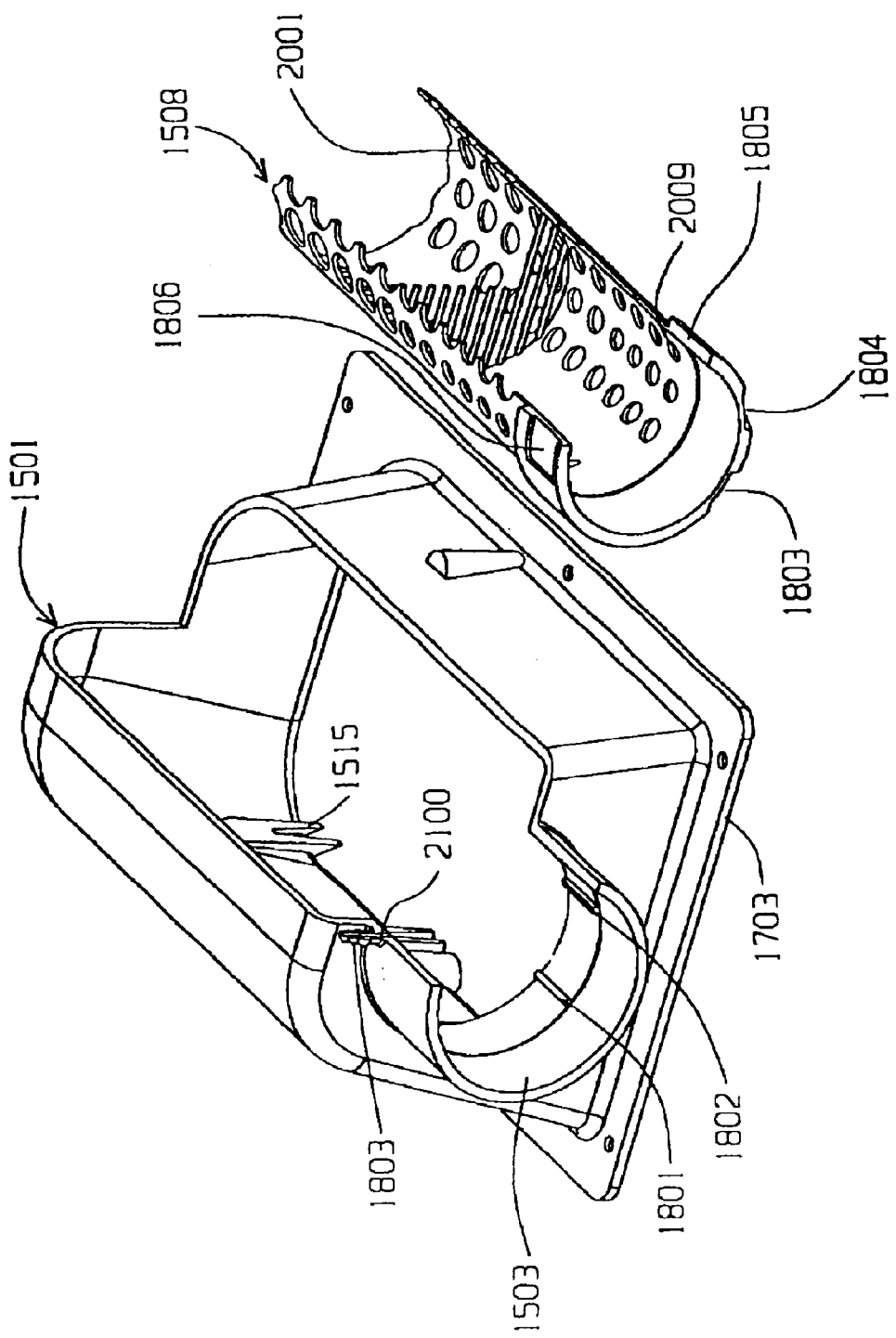
FIG. 21 is a perspective view with a partial cutaway of the FIG. 15 housing, the preferred filter core and showing the ridge/slot alignment of the filter core inside the housing outlet.

Referring next to FIG. 21 the alignment of the recess 1806 (gasket 1807 is not shown) with the entry port 2100 of the safety/sanitation port 2003 is shown.

Referring next to FIG. 22 the gasket 1807 is seen sealing the entry port 2100 of the safety/sanitation port 2003.

Figure 23:
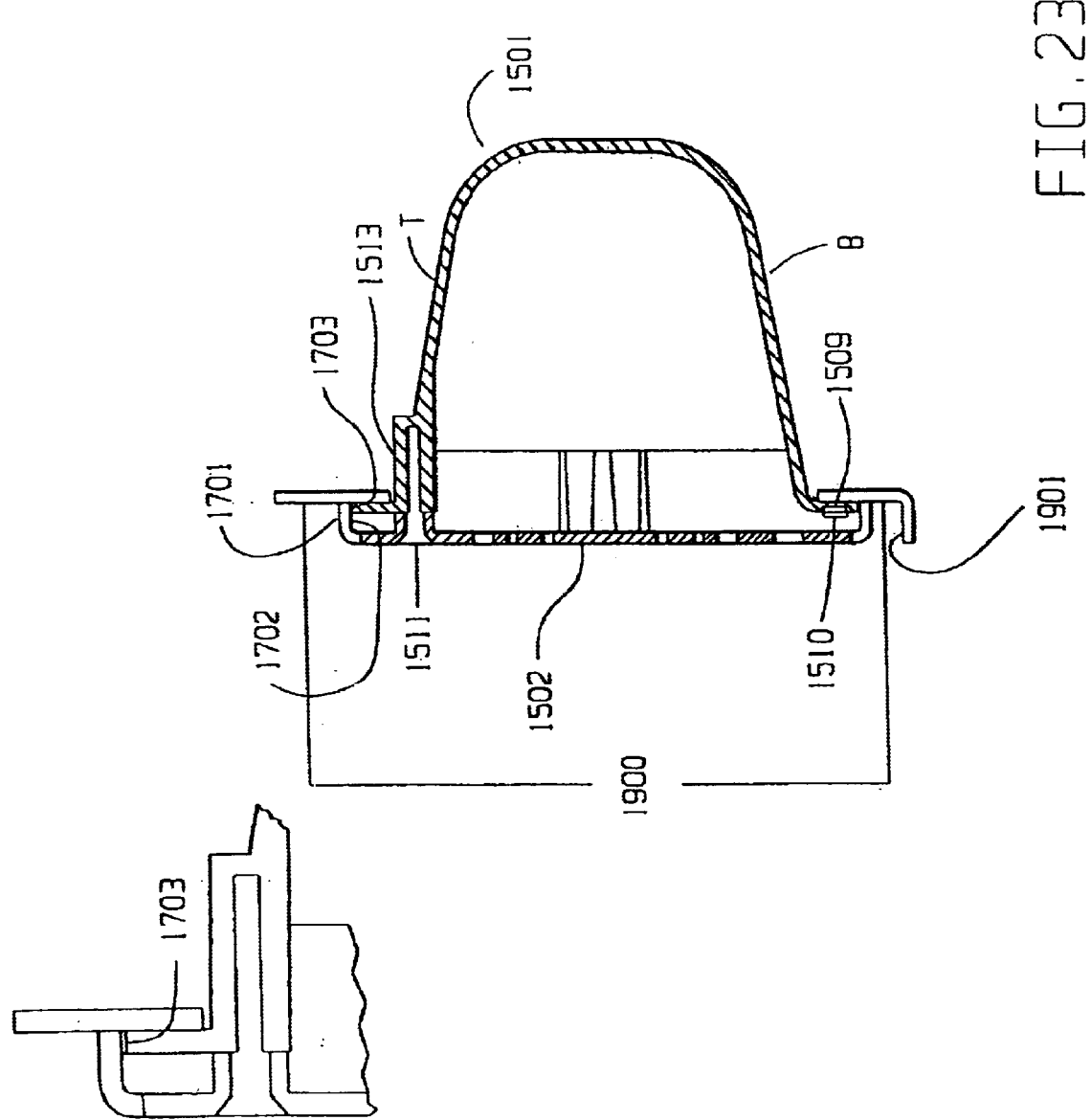
FIG. 23 is a vertical sectional view taken along line 23-23 of FIG. 15.

Referring next to FIG. 23 the faceplate 1502 is shown mounted to the housing 1501 in a sectional view. The support ledge 1702 is shown overlapping the entire peripheral edge 1703 of the housing 1501. In the preferred embodiment shown in FIGS. 24,25 the screw 1511 and screw boss 1513 are deleted. Then the faceplate 1502 is held in place only with the support ledge 1702 and the magnets 1509, 1510.

Figure 24:
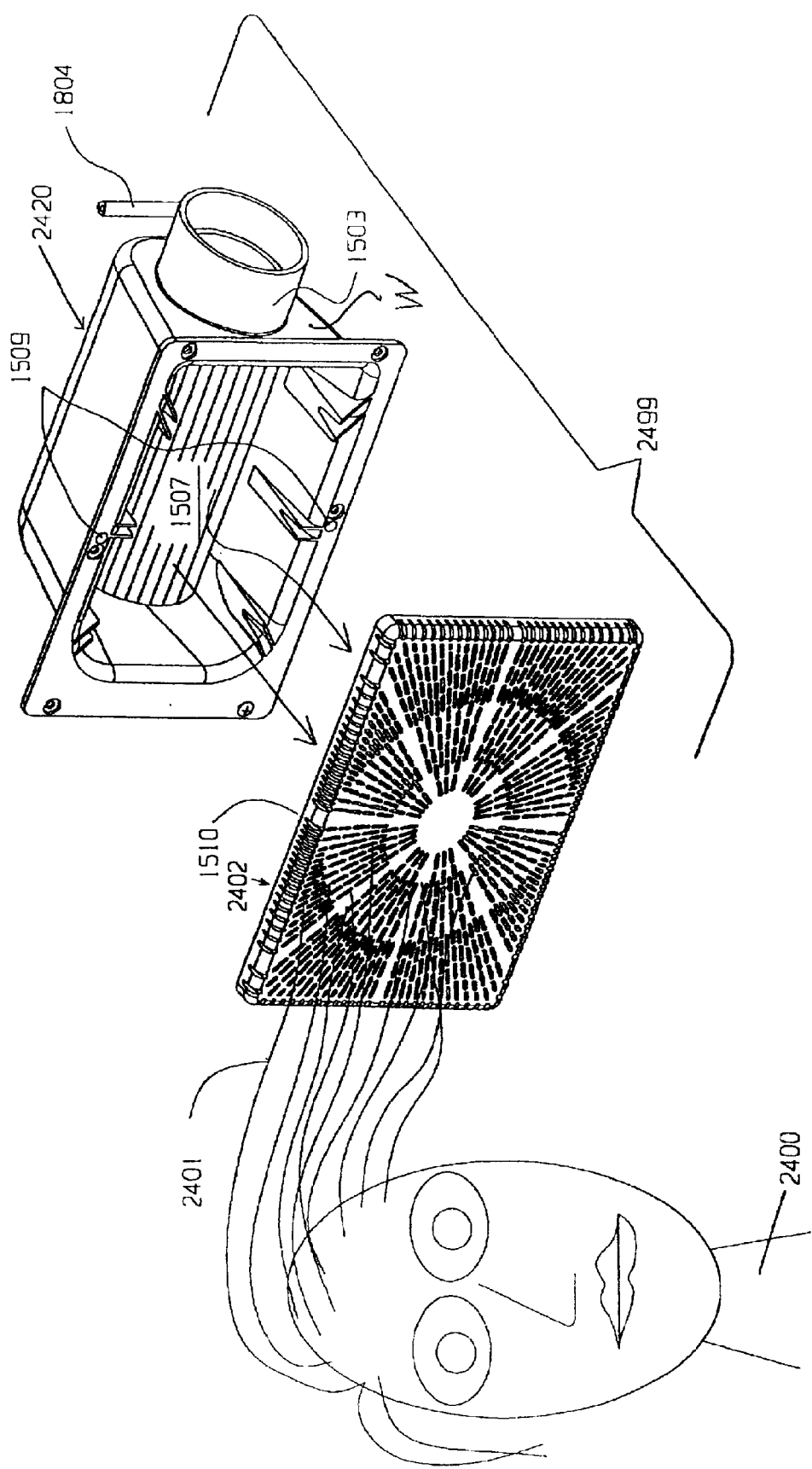
FIG. 24 is a top perspective view of a user getting his or her hair entrapped in the preferred embodiment faceplate/housing design, wherein only the magnets hold the faceplate to the housing, thereby enabling a safety oriented pop off faceplate as well as a safety oriented pop off filter core.
Figure 25:
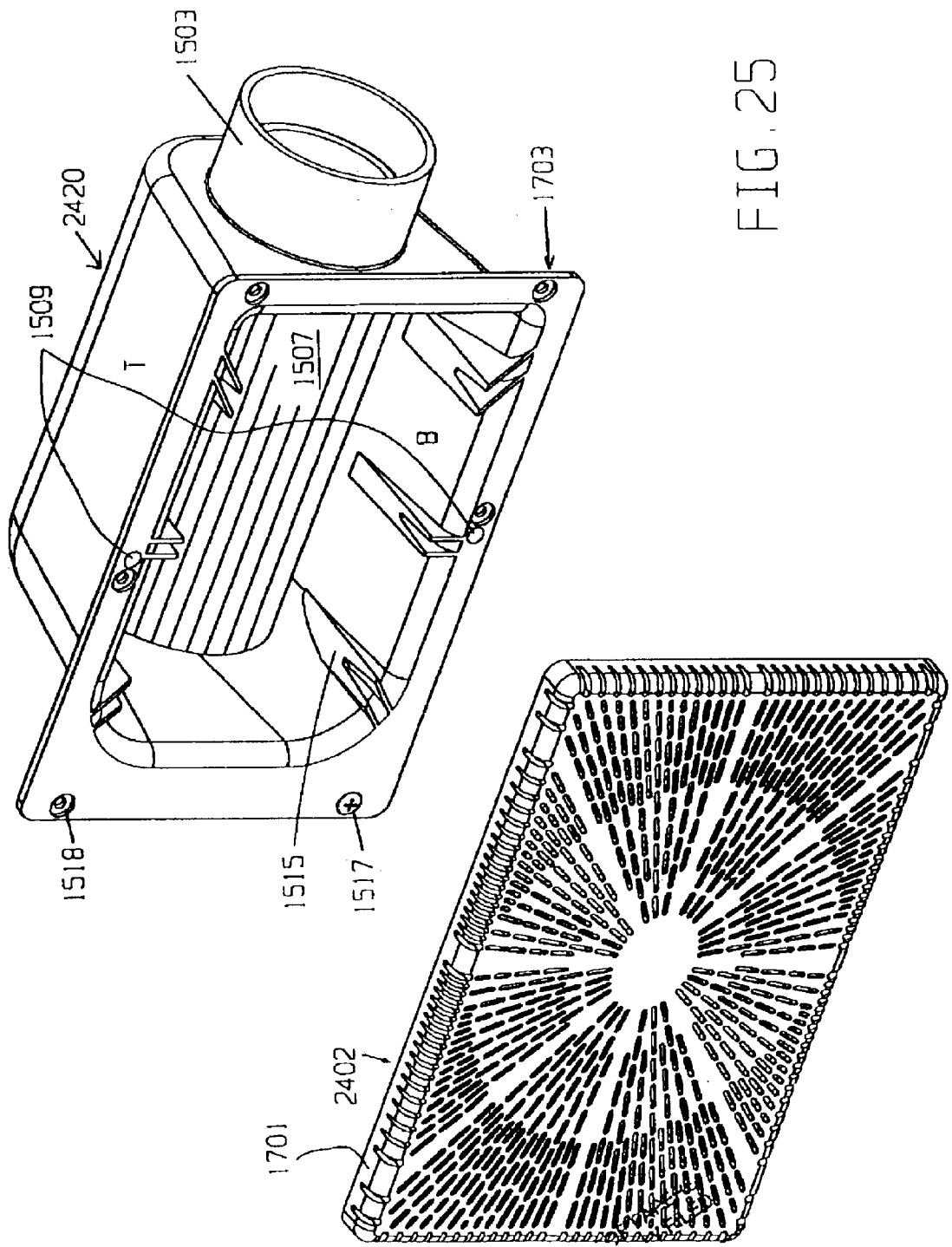
FIG. 25 is a top perspective view of the preferred embodiment pop-off faceplate/housing shown in FIG. 24.

Referring next to FIGS. 24,25 the preferred embodiment suction/filter 2499 is shown. The faceplate 2402 no longer has a mounting hole. Otherwise it is identical to the FIG. 15 embodiment. The housing 2420 no longer has screw bosses. Otherwise it is identical to the FIG. 15 embodiment.

In operation a user 2400 may get his or her hair 2401 sucked into the faceplate 2402 and entangle both the faceplate 2402.

The preferred embodiment suction/filter 2499 protects the user from drowning in the whirlpool by providing a pop off faceplate 2402 which is only held in place by small magnets 1509,1510. Additionally the filter 1507 and filter core 1508 pop out based on the choice of forming a narrow collar 1805 as well as sloping the outlet wall W inward an angle SW which may be about 4° as shown in FIG. 15.

Figure 26:
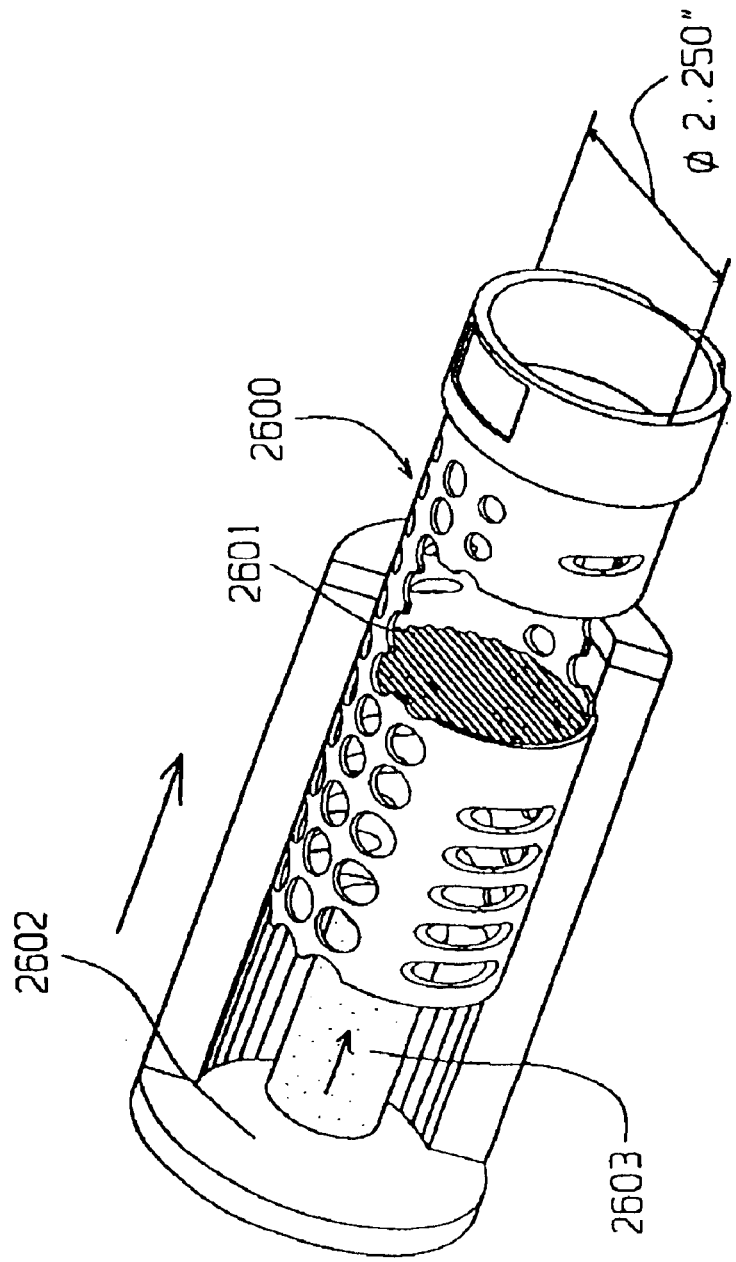
FIG. 26 is an exploded view of the preferred embodiment suction/filter.

Referring next to FIG. 26 an improved filter core 2600 has an additional feature of a cage 2601 built into the hollow internal section of the body. A chemical anti-microbial time release tablet 2603 can be inserted between 2601 and 2602, the end cap of the filter cartridge. The tablet 2603 augments the germ killing properties of the entire system.

The filter core 1508 and/or filter 1507 can be made to include the anti-microbial features of U.S. Pat. No. 6,283,308. The filter combination 1507/1508 would include a wet laid polypropylene membrane, inner perforated core member and yarn and an impregnation of at least one of these components of a non-leaching anti-microbial agent selected from the group consisting of 2,4,4-trichloro-2-hydroxy diphenol ether and 5-chloro-2phenol (2,4 dichlorophenoxy) compounds.

Referring to FIGS. 27,28 a prior art (U.S. Pat. No. 5,799,339) suction device 10P is shown. The safety cover assembly is generally referred to by the reference numeral 10P, and includes a cover 12P, a threaded base 14P, a gasket 16P, a threaded collar 18P, an elbow fitting 20P, a stainless steel screw 22P and a name plate 24P. As will be described below, the cover 12P and the base 14P have interior walls that act as cooperating guide vanes 26BP and 28BP to advantageously reduce turbulence and vortexing of the water passing through the safety cover assembly 10P. Thus, the guide vanes 26BP and 28BP allow the safety cover assembly 10P to handle high flow rates of approximately 200 gallons per minute while simultaneously reducing the likelihood that hair from a user will become entangled inside the cover assembly 10P. The guide vanes 26BP and 28BP enable the safety cover assembly 10P to have a relatively small size and yet pass the five pound pull test at high flow rates. The guide vanes 26BP and 28BP also advantageously increase the structural integrity of the safety cover assembly 10P.

The cover 12 of the preferred assembly 10P has a generally square face wall 30P and four sidewalls 32P (collectively referred to as sidewall), all with holes 34P formed therein for water flow therethrough. The total area of the holes 34P in the sidewalls 32P is greater than that of the holes 34P in the face wall 30P which are, in turn, greater than the area of a hole 36P in the base 14P, which mates with a suction drain. The holes 34P in the cover 12P are arranged in the aforementioned manner so that the sater flow through the cover 12P is uniformly low, thereby reducing the suction force adjacent to the cover 12P and reducing the likelihood that the suction force will cause an object to become lodged against either the face wall 30P or sidewalls 32P of the cover 12P.

Because the center 38P of the face wall 30P is an area that would have a high fluid intake flow, the center 38P of the face wall 30P is solid. This solid center section 38P evens out the water flow across the rest of the face wall 30P so that there are no areas of high flow that would create unwanted areas of high suction force.

Guide vanes 26BP and 28BP are integrally formed on the underside of the cover 12P. The guide vanes 26BP and 28BP are at right angles to each other and extend between opposite sidewalls 32P of the cover 12P. The guide vanes 26BP and 28BP do not obstruct any of the holes 34P formed in the face and sidewalls of cover 12P. The advantageously prevents hair from entering the same hole and becoming entangled by wrapping around both sides if a guide vane. Where the guide vanes 26BP and 28BP intersect, a hole through the cover 12P is provided for the mounting screw 22P. The two guide vanes 26BP and 28BP on the underside of the cover 12P are sized to engage with and align with the guide vanes 26BP and 28BP on the base 14P, which is described below.

Guide vane 26BP extends from the face wall 30P of the cover 12P toward base 14P. Guide vanes 26BP and 28BP divide the cover 12P into four portions. The total area of the holes 34P in each position of the cover 12P equals the total area of the holes 34P in each other portion of the cover 12P. Each portion of the cover 12P includes a portion of the face wall 30P and a portion of the sidewall 32P of the cover 12P. The total area of the holes in the portion of the sidewall 32P being greater than the total area of the holes in the portion of the face wall 32P.

The preferred base 14P has a generally square upper surface. The upper surface of the base 14P is sized to mate with the sidewalls 32P of the cover 12P to form a fluid intake chamber 50P inside of the assembly 10P between the cover 12P and the base 14P. The base 14P has an externally threaded end 52P sized to threadedly engage the collar 18P to mount the assembly 10P to the wall 54P of a jetted tub or spa. The gasket 16P is sized to fit around the threaded end 52P of the base 14P and abut the rear surface of the base 14P. The wall 54P of the jetted tub would be located between this gasket 16P and the threaded collar 18P. The gasket 16P can be made of an elastometric material to cushion impacts upon the fitting 10P. The components of the assembly 10P can be made of ABS plastic or polycarbinate material by well known injection molding techniques.

A first end 56P of the elbow fitting 10P fits inside the collar 18P and can be attached by adhesive, as is well known in the art. The other end 58P of the elbow fitting 10P can be connected to a suction drain of a water circulation system that requires a relatively high rate of intake water flow.

The invention shown in FIGS. 29,30 modify the cover 12P with the features of cover 12PP. The new suction filter is denoted 2700. Cover 12PP has four slots 59P along the four quadrants of the peripheral edge 3000 of the cover 12PP. Each slot 5PP receives a disposable filter 60P. Each disposable filter 60P consists of a plastic rim 3001 and a filter element 3002. Quadrant dividers 61P provide support for the disposable filters 60P, so they don't get sucked into the fluid intake chamber 50P. All other components of the suction 10P are present in the suction/filter 2700. One skilled in the art could use the FIG. 29 invention technique to apply a similar design to any know suction device.

Nominal Dimensional Measurements are:

| | | |
|---|---|---|
| d1 | 5.40 | inches |
| d2 | 12.77 | inches |
| d3 | .25 | inches (O.D.) |
| d4 | Blank | |
| d5 | Blank | |
| d6 | 3.50 | inches |
| d7 | 6/32 | inches (O.D.) |
| d8 | 11/32 | inches (O.D.) |
| d9 | Blank | |
| d10 | Blank | |
| d11 | .17 | inches (O.D.) |
| d12 | 2.27 | inches (O.D.) |
| d13 | R5.0 | inches (Radius) |
| d14 | 4/32 | inches (O.D.) |
| d15 | 9/32 | inches (O.D.) |
| d16 | 10.00 | inches |

Although the present invention has been described with reference to preferred embodiments, numerous modifications and variations can be made and still the result will come within the scope of the invention. No limitation with respect to the specific embodiments disclosed herein is intended or should be inferred.

We claim:

1. A combination water filter and suction device for a tub recirculation system, said suction/filter comprising:

a housing having a mounting surface for providing a flush mount to an inside of a tub, below a fill line of the tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the water in the tub from the underwater and to continuously filter said water with a replaceable filter; and wherein the removable filter further comprises an internal core, said core having a plurality of holes with ascending size away from the output orifice to provide for an efficient flow of water through a surrounding filter.

2. A combination water filter and suction device for a whirlpool bath, the device comprising:

housing means functioning to support a removable filter means and provide an inlet opening contiguous with an inner surface of the whirlpool bath;

faceplate means functioning to cover the inlet opening and prevent body entrapment, prevent hair entrapment, and prevent accidental breakage thereof; and wherein the housing further comprises an outlet port having a safety/sanitation port means functioning to create cavitation if the whirlpool bath is operated without the removable filter means.

3. A combination water filter and suction device for a tub recirculation system, said suction/filter comprising:

a housing having a mounting surface for providing a flush mount to an inside of a tub, below a fill line of the tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the water in the tub from the underwater and to continuously filter said water with a replaceable filter; and wherein the faceplate further comprises a plurality of flow through holes including drainage holes along a bottom edge thereof.

4. The apparatus of claim 3, wherein the faceplate further comprises a peripheral ledge sized for an overlapped fit around the mounting surface of the housing, and a mounting magnet.

5. A combination water filter and suction device for a tub recirculation system, said suction/filter comprising:

a housing having a mounting surface for providing a flush mount to an inside of a tub, below a fill line of the tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the Water in the tub from the underwater and to continuously filter said water with a replaceable filter; and wherein the faceplate further comprises a plurality of holes including drainage holes along a bottom peripheral edge, thereby enabling a complete drainage of the housing after each use.

6. A combination water filter and suction device for a tub recirculation system, said suction/filter comprising:

a housing having a mounting surface for providing a flush mount to an inside of a tub, below a fill line of the tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the water in the tub from the underwater and to continuously filter said water with a replaceable filter; and wherein the faceplate further comprises a radiating slot pattern from a central point of the faceplate.

7. A combination water filter and suction device for a tub recirculation system, said suction/filter comprising:

a housing having a mounting surface for providing a flush mount to an inside of a tub, below a fill line of the tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the water in the tub from the underwater and to continuously filter said water with a replaceable filter; and wherein the faceplate further comprises a plurality of structural fins on a back side thereof, said fins sized to fit into a set of receiving slots in the housing, thereby providing a resistance to breakage of the faceplate.

8. The apparatus of claim 7, wherein the faceplate further comprises a peripheral ledge to overlap the mounting surface of the housing.

9. The apparatus of claim 8, wherein the faceplate further comprises a mounting magnet having a location opposite a housing receiver, thereby providing a pop off mount for the faceplate.

10. The apparatus of claim 9, wherein the housing receiver further comprises a magnet.

11. A combination water filter and suction device for a tub recirculation system, said suction/filter comprising:

a housing having a mounting surface for providing a flush mount to on inside of a tub, below a fill line of a tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the water in the tub from the underwater and to continuously filter said water with a replaceable filter;

wherein the input orifice further comprises a rectangular shape, and the housing further comprises a radiused semi-cylindrical shape with a forward sloping bottom to provide insertability into a rectangular opening in a tub wall and a complete drainage of water from the housing when the tub is empty; and wherein the faceplate further comprises a plurality of holes including drainage holes along a bottom peripheral edge.

12. A combination water filter and suction device for a tub recirculation system, said suction/filter comprising:

a housing having a mounting surface for providing a flush mount to an inside of a tub, below a fill line of the tub;

said housing having an input orifice contiguous with the inside of the tub;

said housing having an outlet port located behind the mounting surface;

said input orifice having a ventilated faceplate;

a removable filter mounted inside the housing having a connection to the outlet port, thereby providing a suction device to intake all the water in the tub from underwater and to continuously filter said water with a replaceable filter;

wherein the housing comprises a connection for the removable filter from the connection to the outlet port;

wherein the connection further comprises an inward cant to an outlet sidewall of the housing, said outlet sidewall containing the outlet port; and wherein the outlet port further comprises a safety/sanitation port having a connection to ambient air, said connection ending at a location above a water line of the tub, wherein the operation of the recirculation system without the removable filter allows the ambient air into the recirculation system, thereby causing a cavitation.

* * * * *

UNITED STATES PATENT AND TRADEMARK OFFICE
CERTIFICATE OF CORRECTION

PATENT NO. : 6,751,814 B2
DATED : June 22, 2004
INVENTOR(S) : Roy W. Mattson, Jr. and Paulette C. Ogden It is certified that error appears in the above-identified patent and that said Letters Patent is hereby corrected as shown below:

Column 13,
Lines 10-11, 41-42 and 62-63, "water in the tub from the underwater" should read -- water in the tub from underwater --.

Column 14,
Lines 14-15, 30-31 and 57-58, "water in the tub from the underwater" should read -- water in the tub from underwater --.

Signed and Sealed this

Tenth Day of May, 2005

JON W. DUDAS
*Director of the United States Patent and Trademark Office*